United States Patent
Wei et al.

(10) Patent No.: US 11,522,790 B2
(45) Date of Patent: Dec. 6, 2022

(54) MULTIPATH DATA TRANSMISSION PROCESSING METHOD AND NETWORK DEVICE

(71) Applicant: HUAWEI TECHNOLOGIES CO., LTD., Guangdong (CN)

(72) Inventors: Anni Wei, Shenzhen (CN); Hinghung Anthony Chan, Plano, TX (US); Chunshan Xiong, Shenzhen (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 251 days.

(21) Appl. No.: 16/733,915

(22) Filed: Jan. 3, 2020

(65) Prior Publication Data
US 2020/0145324 A1    May 7, 2020

Related U.S. Application Data

(63) Continuation of application No. PCT/CN2018/092026, filed on Jun. 20, 2018.

(30) Foreign Application Priority Data

Jul. 5, 2017 (CN) .......................... 201710544954.2

(51) Int. Cl.
*H04L 45/24* (2022.01)
*H04L 5/00* (2006.01)
(Continued)

(52) U.S. Cl.
CPC ............ *H04L 45/24* (2013.01); *H04L 5/0055* (2013.01); *H04L 61/5007* (2022.05);
(Continued)

(58) Field of Classification Search
CPC ... H04L 45/24; H04L 5/0055; H04L 61/2007; H04L 67/141; H04L 69/16; H04L 69/22;
(Continued)

(56) References Cited

U.S. PATENT DOCUMENTS

2011/0296006 A1    12/2011 Krishnaswamy et al.
2012/0144062 A1*   6/2012 Livet .................. H04W 60/005
                                                    709/239

(Continued)

FOREIGN PATENT DOCUMENTS

CN         103516694 A      1/2014
CN         104158761 A      11/2014
(Continued)

OTHER PUBLICATIONS

3GPP TS 23.501 V1.0.0 (Jun. 2017), 3rd Generation Partnership Project; Technical Specification Group Services and System Aspects; System Architecture for the 5G System; Stage 2(Release 15), 145 pages.
(Continued)

*Primary Examiner* — Rina C Pancholi
(74) *Attorney, Agent, or Firm* — Womble Bond Dickinson (US) LLP

(57) ABSTRACT

Embodiments of this application relate to a multipath data transmission processing method and a network device. A first network device receives a packet from a first host device, and determines a first connection identifier between the first network device and a second network device based on the packet. The first network device encapsulates the packet based on the first connection identifier. The first network device sends the encapsulated packet to the second network device through one of a plurality of subflows between the first network device and the second network device. According to the embodiments of this application,
(Continued)

multipath data transmission is implemented, a data transmission rate is increased, and a host device does not perceive a plurality of paths. The embodiments of this application can be applied to any existing communications system.

18 Claims, 12 Drawing Sheets

(51) Int. Cl.
*H04L 67/141* (2022.01)
*H04L 69/16* (2022.01)
*H04L 69/22* (2022.01)
*H04L 61/5007* (2022.01)

(52) U.S. Cl.
CPC ............ *H04L 67/141* (2013.01); *H04L 69/16* (2013.01); *H04L 69/22* (2013.01)

(58) Field of Classification Search
CPC ......... H04L 12/66; H04L 29/06; H04L 29/08; H04L 69/162
See application file for complete search history.

(56) References Cited

U.S. PATENT DOCUMENTS

| | | | |
|---|---|---|---|
| 2016/0037428 A1* | 2/2016 | Kanugovi | H04L 69/16 370/329 |
| 2016/0119196 A1* | 4/2016 | Comeras | H04L 69/14 709/226 |
| 2018/0219979 A1* | 8/2018 | Javali | H04L 67/28 |
| 2018/0248984 A1* | 8/2018 | Bonaventure | H04L 69/28 |
| 2020/0359264 A1* | 11/2020 | Rácz | H04W 76/16 |

FOREIGN PATENT DOCUMENTS

| | | |
|---|---|---|
| CN | 104285472 A | 1/2015 |
| CN | 104854837 A | 8/2015 |
| CN | 105703999 A | 6/2016 |
| CN | 106464567 B | 4/2020 |

OTHER PUBLICATIONS

Zhang Zhichao, "Design and Implementation of Host Identity based Multipath TCP",Thesis Sbumitted to Tsinghua University, May 2012, with an English abstract, total 86 pages.
Menon R Mukherjee 128 Technology A: "Network Enhancements for QUIC draft-abilash-quic-network-00", Internet Engineeringtask Force,IETF;Standardworkingdraft, Internet Society (ISOC) 4 Rue Des Falaises CH-1205 Geneva, Switzerland, Jan. 5, 2017 (2017-U1-U5), pp. 1-7,XPOI5117267, total 7 pages.
M. Boucadair, Ed. et al., "Extensions for Network-Assisted MPTCP Deployment Models,draft-boucadair-mptcp-plain-mode-10",Network Working Group, Internet-Draft,Intended status: Standards Track,Mar. 9, 2017,total 25 pages.
M. Cullen et al. "Problem Statement: Bandwidth Aggregation for Internet Access,draft-zhang-banana-problem-statement-03.txt" Internet-Draft Intended Status: Informational,Oct. 31, 2016,total 17 pages.
Mondal Abhijit et al: "Viscous: An End to End Protocol for Ubiquitous Communication over Internet of Everything", 38th Annual IEEE Conference on Local Computer Networks, IEEE, Oct. 9, 2017 (Oct. 9, 2017) pp. 312-320,XPU33255573, total 9 pages.
Hamilton J Iyengar I Swett A Wilk Google R: "QUIC A UDP-Based Multiplexed and Secure Transport draft-hamilton-quic-transport-protocol-00", Internet Engineering Task Force, IETF; Standardworkingdraft,Internet Society (ISOC) 4, Rue Des Falaises CH-1205 Geneva, Switzerland, Jul. 8, 2016 (Jul. 8, 2016), pp. 1-39,XP015114170, total 39 pages.

* cited by examiner

MULTIPATH DATA TRANSMISSION PROCESSING METHOD AND NETWORK DEVICE

CROSS-REFERENCE TO RELATED APPLICATIONS

This application is a continuation of International Application No. PCT/CN2018/092026, filed on Jun. 20, 2018, which claims priority to Chinese Patent Application No. 201710544954.2, filed on Jul. 5, 2017. The disclosures of the aforementioned applications are hereby incorporated by reference in their entireties.

TECHNICAL FIELD

Embodiments of this application relate to the field of communications technologies, and in particular, to multipath data transmission.

BACKGROUND

In a standard transmission control protocol (TCP), transmission is performed by using only one path for each connection.

However, in a current mobile internet, a plurality of wireless access technologies are integrated with each other, and a communications terminal usually has a plurality of network interfaces, for example, a wireless fidelity (Wi-Fi) interface and a 3rd generation mobile communications technology (4G) interface. A plurality of available paths exist for communication between two terminals that have a plurality of network interfaces. If only one path is used according to the standard TCP protocol, a waste of other path resources is caused. In addition, currently, an intelligent terminal needs more application programs to access the internet. If these application programs can simultaneously access the Internet through a plurality of paths of different interfaces, network connection problems caused by a link change, a high bit error rate, and the like in a wireless network can be reduced.

Based on this objective, the internet engineering task force (IETF) sets up a bandwidth aggregation for internet access (BANANA) working group and a multipath TCP (MPTCP) working group to study multipath transmission. A quick UDP internet connection (QUIC) working group also studies multipath transmission in the later stage.

Although the existing MPTCP working group and QUIC working group provide multipath transmission solutions, hosts of a transmit end and a receive end that perform multipath transmission, for example, mobile terminals or network servers, can both perceive that data transmission performed by the hosts is multipath data transmission. Therefore, only after a user of the host performs a corresponding operation, for example, an operation such as a system software upgrade, normal multipath transmission can be implemented. Consequently, user experience is affected.

The BANANA working group mainly studies a multipath connection between a home gateway (HG) and a hybrid access aggregation point (HAAP). The BANANA working group is committed to implementing multipath transmission by using intermediate network junctions, to implement perception-free multipath transmission of two hosts. However, at present, the BANANA working group is currently studying perception-free multipath transmission between hosts, and does not provide a specific implementation solution.

SUMMARY

Embodiments of this application provide a multipath data transmission processing method and a network device, to implement multipath data transmission, and enable a host to perceive no multipath data transmission.

According to a first aspect, an embodiment of this application provides a multipath data transmission method. First, a first network device receives a packet from a first host device, and determines a first connection identifier between the first network device and a second network device based on the packet. Then, the first network device encapsulates the packet based on the first connection identifier. Finally, the first network device sends the encapsulated packet to the second network device through one of a plurality of subflows between the first network device and the second network device.

According to a second aspect, an embodiment of this application provides a first network device. The first network device includes a receiver, a processor, and a transmitter. The receiver is configured to: receive a packet from a first host device, and determine a first connection identifier between the first network device and a second network device based on the packet. The processor is configured to encapsulate the packet based on the first connection identifier. The transmitter is configured to send the encapsulated packet to the second network device through one of a plurality of subflows between the first network device and the second network device.

In the embodiments of this application, the first connection identifier is determined by using the packet received by the first network device, and the encapsulated packet is sent to the second network device through one of the plurality of subflows. Therefore, in the embodiments of this application, multipath data transmission is implemented, a data transmission speed is increased, and a host device does not perceive the multipath data transmission, so that a software and hardware update does not need to be performed on the host device, and the host device does not need to be reconfigured either, thereby not affecting normal usage of a user.

In an example, the determining a first connection identifier between the first network device and a second network device based on the packet is: obtaining a second connection identifier from the packet, where the second connection identifier is a connection identifier between the first host device and the second host device; determining the first connection identifier based on the second connection identifier and a correspondence between the first connection identifier and the second connection identifier, where the first network device includes the correspondence between the first connection identifier and the second connection identifier.

In an example, the second connection identifier includes a socket or an internet protocol (IP) quintuplet of the first host device and the second host device, and the first connection identifier is a connection identifier (connection ID) between the first network device and the second network device.

In an example, the first network device establishes a connection to the second network device, and after the connection is established, the first network device sends a first acknowledgment packet to the second network device, and/or the first network device receives a second acknowledgment packet from the second network device.

In an example, the first network device establishes a connection to the second network device, and the first network device sends an acknowledgment message to the second network device when the first network device receives a packet from the second network device.

In an example, acknowledgment message function deactivation information ACK disable is carried in the process of establishing the connection between the first network device and the second network device.

In an example, the encapsulating, by the first network device, the packet based on the first connection identifier is: encapsulating, by the first network device, an application layer packet based on the first connection identifier.

In an example, the encapsulating, by the first network device, the packet based on the first connection identifier is: encapsulating, by the first network device, an internet protocol (IP) packet based on the first connection identifier.

According to a third aspect, an embodiment of this application provides a multipath data transmission method. A second network device receives a packet through one of a plurality of subflows between the first network device and the second network device. The second network device determines a first connection identifier based on the packet, where the first connection identifier is a connection identifier between a first host device and a second host device, the first host device is a host device connected to the first network device, and the second host device is a host device connected to the second network device. The second network device sends the packet to the second host device based on the first connection identifier.

According to a fourth aspect, an embodiment of this application provides a second network device. The second network device includes a receiver, a processor, and a transmitter. The receiver is configured to receive a packet through one of a plurality of subflows between the first network device and the second network device. The processor is configured to determine a first connection identifier based on the packet, where the first connection identifier is a connection identifier between a first host device and a second host device, the first host device is a host device connected to the second network device, and the second host device is a host device connected to the first network device. The transmitter is configured to send the packet to the second host device based on the first connection identifier.

In the embodiments of this application, the second network device receives the packet that is from the first host and that is forwarded by using the first network device, and determines the first connection identifier based on the packet. The first connection identifier is a connection identifier between the first network device and the second network device. In this case, multipath data transmission is implemented, a data transmission rate is increased, and a host does not perceive the multipath transmission, so that a user does not need to perform a software and hardware update or reconfiguration, thereby improving user experience.

In an example, the determining, by the second network device, a first connection identifier based on the packet is: obtaining, by the second network device, a second connection identifier from the packet, where the second connection identifier is a connection identifier between the first network device and the second network device; and the second network device includes a correspondence between the first connection identifier and the second connection identifier, and the second network device obtains the first connection identifier based on the correspondence and the second connection identifier.

In an example, after the receiving, by a second network device, a packet through one of a plurality of subflows between the first network device and the second network device, the method includes: decapsulating, by the second network device, the packet to obtain an application layer packet.

In an example, the determining, by the second network device, a first connection identifier based on the packet is: obtaining, by the second network device, the first connection identifier in the decapsulation process.

In an example, the first connection identifier includes a socket or an internet protocol (IP) quintuplet of the first host device and the second host device, and the second connection identifier is a connection identifier (connection ID) between the first network device and the second network device.

In an example, the first network device establishes a connection to the second network device, and the first network device sends an acknowledgment message to the second network device when the first network device receives a packet from the second network device.

In an example, before the receiving, by a second network device, a packet through one of a plurality of subflows between the first network device and the second network device, the method includes: establishing, by the second network device, a connection to the first network device, where acknowledgment message function deactivation information ACK disable is carried in the connection establishment process.

According to a fifth aspect, an embodiment of this application provides a communications entity, to implement the data transmission method according to the first aspect.

According to a sixth aspect, an embodiment of this application provides a communications entity, to implement the data transmission method according to the first aspect.

In the embodiments of this application, the first connection identifier is obtained by using the connection identifier, namely, the second connection identifier, between the first host and the second host, and the correspondence between the first connection identifier and the second connection identifier, and the first connection identifier is encapsulated into the packet, so that multipath transmission for intermediate nodes is implemented, a data transmission rate is increased, and the hosts at two ends do not perceive the multipath transmission for the intermediate nodes. Therefore, a user does not need to upgrade software and hardware of the hosts or reconfigure the hosts, thereby not affecting usage of the user, and improving user experience.

DESCRIPTION OF EMBODIMENTS

To make a purpose, technical solutions, and advantages of embodiments of this application clearer, the following describes the technical solutions in the embodiments of this application with reference to the accompanying drawings in the embodiments of this application.

Figure 1:
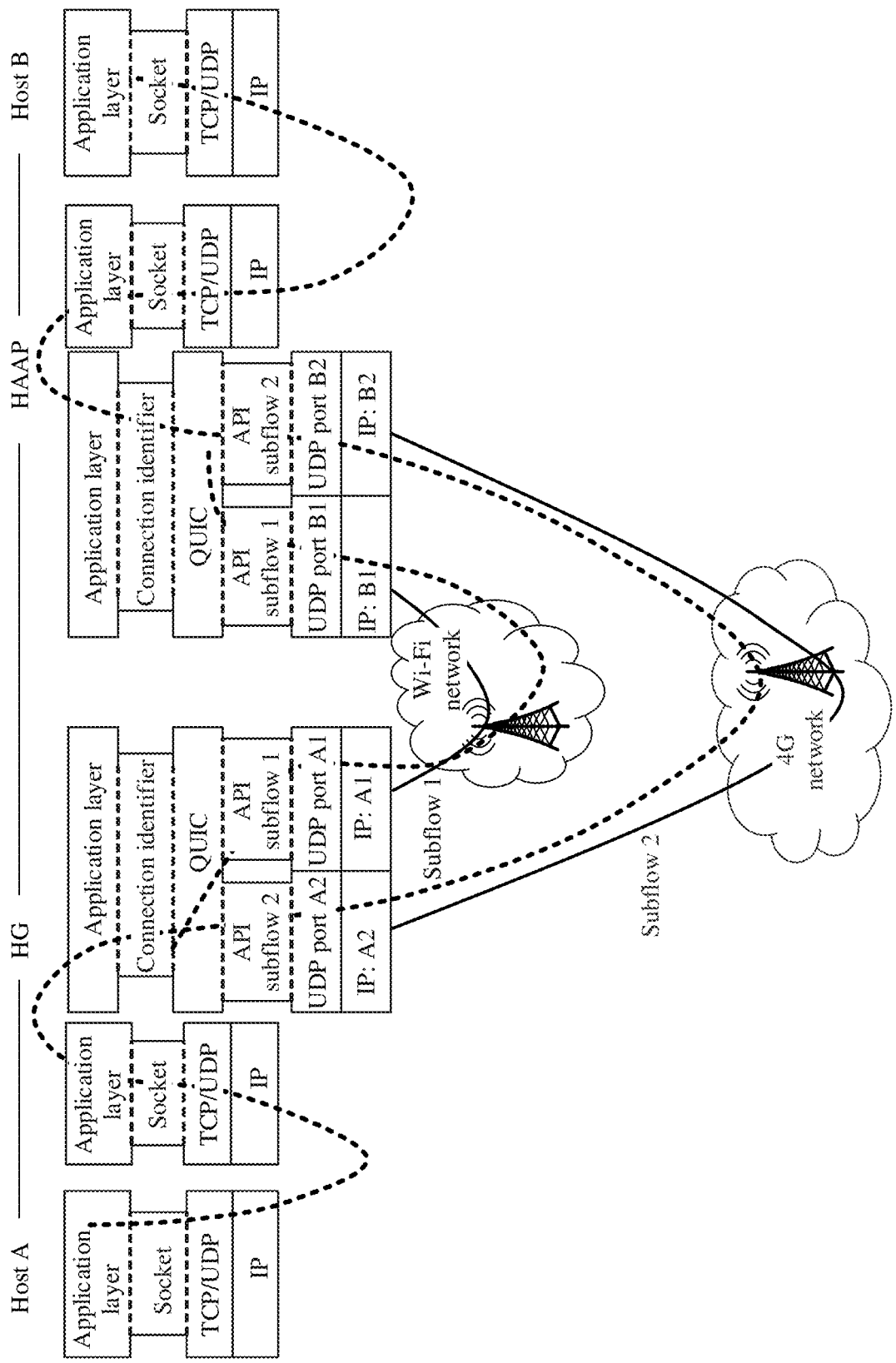
FIG. 1 is a schematic diagram of a protocol stack of QUIC connection-based multipath data transmission according to an embodiment of this application.

FIG. 1 is a schematic diagram of a protocol stack of QUIC connection-based multipath data transmission according to an embodiment of this application.

In FIG. 1, a first host device such as a host A may be a terminal device, and a second host device such as a host B may be a server. Data transmission between the first host device such as the host A and a first network device such as a home gateway (HG) is single-path data transmission, and transport layer protocols of the first host device such as the host A and the first network device such as the HG are TCP protocols or UDP protocols. Data transmission between the first network device such as the HG and a second network device such as a hybrid access aggregation point (HAAP) is multipath data transmission, and transport layer protocols of the first network device such as the HG and the second network device such as the HAAP are QUIC protocols. Data transmission between the second network device such as the HAAP and the second host device such as the host B is single-path data transmission, and transport layer protocols of the second network device such as the HAAP and the second host device such as the host B are the TCP protocols or the UDP protocols.

An example in which the first host device is the host A, the first network device is the HG, the second host device is the host B, and the second network device is the HAAP is used for description below.

The HG has a plurality of interfaces, for example, a 4G interface and a Wi-Fi interface. The HAAP also has a plurality of interfaces, for example, a 4G interface and a Wi-Fi interface. The HG and the HAAP may communicate with the host B through both the Wi-Fi interface and the 4G interface, so that communication bandwidth is increased. In FIG. 1, an IP address of the Wi-Fi interface of the HG is A1, and an IP address of the 4G interface of the HG is A2. An IP address of the Wi-Fi interface of the HAAP is B 1, and an IP address of the 4G interface of the HAAP is B2. The Wi-Fi interface of the HG corresponds to a port A1, and the 4G interface of the HG corresponds to a port A2. The Wi-Fi interface of the HAAP corresponds to a port B1, and the 4G interface of the HAAP corresponds to a port B2.

It can be learned from FIG. 1 that, in this embodiment of this application, data is received and sent by the host A through a single path, and data is also received and sent by the host B through a single path. The host A and the host B do not perceive multipath transmission between intermediate devices including the HG and the HAAP. Therefore, parameters of the host A and the host B do not need to be modified, in other words, software and hardware of the host A and the host B do not need to be upgraded. Any existing host device, including any existing terminal and server, can implement multipath data transmission. Therefore, normal usage of a user is not affected while a data transmission rate is increased.

The following describes in detail, with reference to FIG. 1, a multipath data transmission processing method provided in an embodiment of this application.

In FIG. 1, the host A and the HG perform data transmission by using a transmission control protocol/internet protocol (TCP/IP). A transport layer protocol in the TCP/IP protocol may be the TCP or the user datagram protocol (UDP).

In the host A, application layer data arrives at a transport layer (a TCP layer or a UDP layer) by using a socket. The socket is an intermediate software abstraction layer for communication between an application layer and a TCP/IP layer, and is essentially a programming interface (API). A socket is used to describe an IP address and a port, and is a handle of a communications link. In the host A, after the application layer data arrives at the transport layer, a packet header of an application layer packet is encapsulated, to obtain a TCP packet or a UDP packet. After the TCP packet or the UDP packet arrives at a network layer (the IP layer), and a header of the TCP packet or the UDP packet is encapsulated at the network layer, an IP packet is obtained. The host A transmits the IP packet to the HG through a single path. The HG, as an intermediate node, receives the IP packet from the host A.

In the HG, the IP packet first arrives at a transport layer (a TCP/UDP layer) through a network layer (an IP layer). At the transport layer, the IP packet is decapsulated to obtain the TCP packet or the UDP packet. The TCP packet or the UDP packet arrives at an application layer by using a socket of the HG. Then, the HG encapsulates the application layer data into a packet header of a QUIC packet, to obtain the QUIC packet. Subsequently, the QUIC packet is transmitted to the HAAP through the UDP layer and the IP layer through one of a plurality of subflows, for example, a subflow 2 or a subflow 1.

It should be noted that the foregoing describes a case in which the HG encapsulates the application layer packet. In this case, the HG decapsulates, to obtain the application layer packet, the IP packet that is received by the HG and that is from the host A, and then encapsulates the application layer packet. Actually, the HG may not decapsulate the IP packet received by the HG (that is, from the host A), but directly encapsulates the IP packet received by the HG. That is, the HG does not need to decapsulate the IP packet to obtain the application layer packet, but directly encapsulates the IP packet received by the HG into the packet header of the QUIC packet. In this case, after receiving the packet from the HG, the HAAP can directly obtain the IP packet by removing only the packet header of the QUIC packet. Then, the HAAP sends the IP packet to the host B. FIG. 1 shows the previous implementation. That is, FIG. 1 shows only that the HG decapsulates the IP packet received by the HG to obtain the application layer packet, and then encapsulates the application layer packet.

It should be noted that a connection ID in FIG. 1 is only a field in the packet header of the QUIC packet, and does not represent that the connection ID is a layer in a protocol. That is, the HG not only encapsulates the application layer data into the packet header of the QUIC packet, but also encapsulates the connection identifier (connection ID) into the packet header of the QUIC packet. Similarly, an API subflow 2 and an API subflow 1 in FIG. 1 each do not represent a layer in a protocol, and are only used to represent two different subflows.

It should be noted that a path has a one-to-one correspondence with a subflow, in other words, a quantity of paths is equal to a quantity of subflows.

In the HG, the HG implements multipath data transmission based on the QUIC protocol. The QUIC protocol is a transmission protocol for implementing multiplexing and security protection. The QUIC protocol not only integrates advantages of the hypertext transfer protocol (HTTP) 2.0, transport layer security (TLS), and the TCP protocol, but also has advantages such as a lower access delay, more convenient traffic congestion control, and a better correction mechanism.

Figure 2:
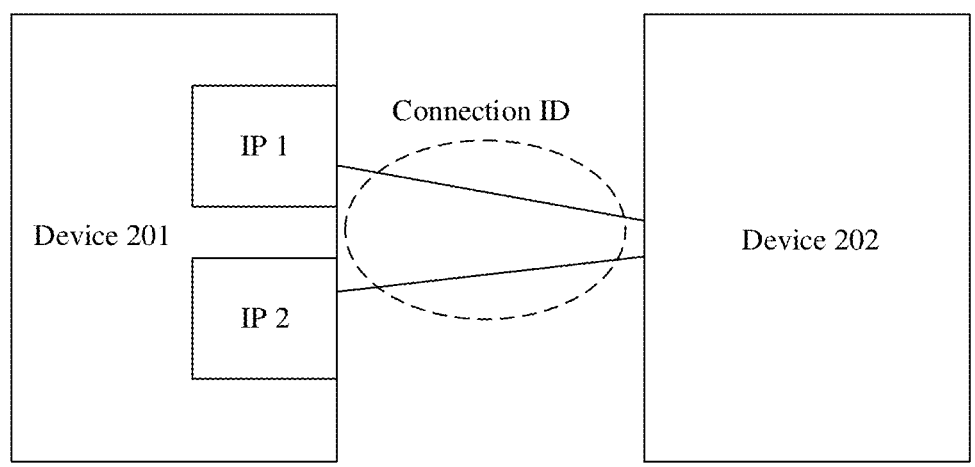
FIG. 2 is a schematic diagram showing that one QUIC connection supports a plurality of IP addresses according to an embodiment of this application.

It is specified in the QUIC protocol that QUIC connections using a same connection identifier (connection ID) can support a plurality of IP addresses. In other words, a device having a plurality of IP addresses can perform multipath data transmission with another device by using a same connection ID, referring to FIG. 2. In FIG. 2, a device 201 has a plurality of IP addresses including an IP 1 and an IP 2. The device 201 may perform multipath data transmission with a device 202 by using the IP 1 and the IP 2. Connection identifiers connection IDs of multipath connections between the device 201 and the device 202 are the same.

A typical application scenario is as follows: One smartphone supports a plurality of IP addresses, including, for example, a home wireless fidelity (Wi-Fi) IP address and a 3rd generation partnership project (3GPP) IP address of a mobile communications network. A user watches an online video at home by using the Wi-Fi IP address of the smartphone. Then the user goes out of home. In this case, the smartphone is out of coverage of the home Wi-Fi network, so that the user continues to watch the online video by using the smartphone by using an IP address of the 4G network. QUIC connections between the smartphone and a server providing the online video correspond to a same connection ID. Although a sub-connection, namely, a Wi-Fi connection, of the QUIC connection is disconnected, another sub-connection, namely, a 4G sub-connection, of the QUIC connection is responsible for connecting the smartphone and the server providing the online video, and both the 4G connection and the Wi-Fi connection correspond to a same connection ID. Therefore, an online video play service is not interrupted, and the user can continuously watch the online video by using the smartphone without interruption.

In FIG. 1, the HG and the host A perform single-path data transmission, and the HG and the HAAP perform multipath data transmission. Therefore, the HG needs to complete mapping between a single path and a plurality of paths. Details are described below. For single-path data transmission, in the TCP/UDP transport protocol, different connections are identified by using socket or IP quintuplets. For multipath data transmission, in the QUIC, a same application layer packet corresponds to a same connection ID, and a same connection ID corresponds to a plurality of transmission paths.

In an example, the HG stores a correspondence between a socket and a connection identifier (connection ID). The connection identifier (connection ID) is a connection identifier between the HG and the HAAP. Refer to the following Table 1.

TABLE 1

| Socket | Connection ID |
|--------|---------------|
| 1      | C1            |
| 2      | C2            |
| 3      | C3            |
| ...    | ...           |
| Sn     | Cn            |

It can be learned from the foregoing Table 1 that there is a one-to-one correspondence between the socket and the connection identifiers (connection IDs). When the socket of the host A is obtained, the connection identifier (connection ID) between the HG and the HAAP can be obtained by querying Table 1.

In an example, the host A sends a packet to the HG, and the packet carries the socket. The HG obtains the connection identifier (connection ID) between the HG and the HAAP based on the socket and by querying the foregoing Table 1.

In another example, the host A sends a packet to the HG. After receiving the packet, the HG obtains an IP quintuplet from the packet. The IP quintuplet includes a port number of the host A, an IP address of the host A, a protocol number, a port number of the host B, and an IP address of the host B. In addition, the HG stores a correspondence between an IP quintuplet and a socket. The HG obtains a socket based on the IP quintuplet and by using the correspondence between an IP quintuplet and a socket. Subsequently, the HG obtains a connection identifier (connection ID) between the HG and the HAAP based on the socket and by querying the foregoing Table 1.

In FIG. 1, the host A sends a packet to the HG, and the HG decapsulates the IP packet received by the HG to obtain an application layer packet. The application layer packet has a one-to-one correspondence with a QUIC connection identifier (QUIC connection ID). In other words, different pieces of application layer data correspond to different QUIC connection IDs. For example, a QQ application and a Taobao application respectively correspond to different QUIC connection IDs. For example, application layer data of the QQ application corresponds to a QUIC connection ID 1, and application layer data of the Taobao application corresponds to a QUIC connection ID 2.

It can be learned from the foregoing description that the HG obtains, based on the socket carried in the data packet received by the HG or based on the IP quintuplet, the corresponding QUIC connection ID by querying Table 1. In FIG. 1, the HG encapsulates the application layer packet based on the QUIC connection ID, and encapsulates the QUIC connection ID into a packet header of the application layer packet, to obtain a QUIC packet. At a convergence layer, the HG splits the QUIC packet. For example, a QUIC packet that belongs to a frame header is transmitted through the subflow 1, and a QUIC packet that belongs to a data frame is transmitted through the subflow 2.

In an example, the HG determines quality of each path based on a feature such as a delay of each of a plurality of paths, transmits, through a path with a low delay, a QUIC packet that belongs to a frame header in a frame of data, and transmits, through a path with a high delay, a QUIC packet that belongs to a data frame part in a frame of data.

It should be noted that, how the HG performs splitting, namely, a splitting rule used by the HG, is not limited to the foregoing description, and this application does not limit a splitting manner used by the HG.

In FIG. 1, in the HG, some QUIC packets such as QUIC packets that belong to a frame header, arrive, through a subflow such as the subflow 1, at a UDP layer port 1 corresponding to the subflow 1; some other QUIC packets such as QUIC packets that belong to a data frame, arrive, through another subflow such as the subflow 2, at a UDP layer port 2 corresponding to the subflow 2. At the transport layer, the HG encapsulates a QUIC packet 1 corresponding to the subflow 1 to obtain a corresponding UDP packet 1, or encapsulates a QUIC packet 2 corresponding to the subflow 2 to obtain a corresponding UDP packet 2. Then, the UDP packet 1 corresponding to the subflow 1 arrives at a corresponding network layer 1 (an IP layer 1), and the UDP packet 2 corresponding to the subflow 2 arrives at a corresponding network layer 2 (an IP layer 2). At the network layer, the HG encapsulates the UDP packet 1 corresponding to the subflow 1 to obtain an IP packet 1, or encapsulates the UDP packet 2 corresponding to the subflow 2 to obtain IP data 2. In the UDP, the IP packet 1 corresponding to the subflow 1 is sent to the HAAP through a path such as a Wi-Fi network, or the IP packet 2 corresponding to the subflow 2 is sent to the HAAP through another path such as a 4G network.

It can be learned that the HG obtains, based on the stored correspondence between a socket and a connection ID and by parsing a data packet received by the HG, a socket carried in the packet, and further obtains a corresponding connection ID. It should be noted that the HG stores a plurality of connection IDs. A plurality of destination hosts, namely, servers, are connected to the HG, and corresponding destination hosts can be determined based on different connection IDs. Multipath selection is irrelevant to the connection ID. In other words, it does not mean that different paths are selected for different connection IDs. There may be a plurality of path selection manners. For example, in the foregoing description, the data packet that belongs to a frame header part is transmitted through one path, and the data packet that belongs to a data frame part is transmitted through another path.

In FIG. 1, correspondingly, the HAAP receives the IP packet from the HG through a plurality of paths. The HAAP decapsulates the IP data to obtain the UDP packet. The HAAP decapsulates the UDP packet to obtain the QUIC packet, and obtains the connection ID between the HG and the HAAP. The HAAP decapsulates the QUIC packet to obtain the corresponding application layer packet. The HAAP obtains the connection ID by using the application layer packet, and obtains the corresponding socket based on the correspondence between a connection ID and a socket, that is, by querying the foregoing Table 1. The HAAP obtains the IP quintuplet based on the socket and by using the correspondence between a socket and an IP quintuplet that is stored by the HAAP. Alternatively, the host B stores the correspondence between a connection ID and an IP quintuplet, and the host B obtains the IP quintuplet based on the connection ID. The HAAP encapsulates the IP quintuplet into an application layer packet, to obtain a TCP/UDP packet. Then, the HAAP encapsulates the TCP/UDP packet to obtain an IP packet, and sends the IP packet to the host B. The host B receives the IP packet from the HAAP, and decapsulates the IP packet to obtain the TCP/UDP packet. Then, the host B decapsulates the TCP/UDP packet to obtain the application layer packet, and performs corresponding processing based on the application layer packet.

In the foregoing description, the HG decapsulates the IP packet received by the HG, to obtain the application layer packet, obtains the connection ID based on the socket, and encapsulates the application layer packet based on the connection ID to obtain the IP packet. Similarly, the HAAP also obtains the application layer packet after decapsulating the IP packet received by the HAAP, obtains the socket based on the connection ID, obtains the IP quintuplet based on the socket, encapsulates the IP quintuplet into the application layer packet, and then sends the obtained IP packet. The manners of processing packets by the HG and the HAAP in this embodiment of this application are not limited thereto. The following describes in detail another manner of processing a packet by the HG and the HAAP according to an embodiment of this application.

The HG receives an IP packet from the host A. Herein, the IP packet is referred to as a first IP packet. The HG does not decapsulate the first IP packet, but encapsulates a QUIC connection identifier (connection ID) into a packet header of the first IP packet to obtain a QUIC packet. The host A uses the first IP packet received by the host A as a content part of the packet, and encapsulates the first IP packet by using the connection ID, to obtain the QUIC packet. The host A encapsulates the QUIC packet to obtain a TCP/UDP packet, and then encapsulates the TCP/UDP packet to obtain an IP packet. Herein, the IP packet is referred to as a second IP packet. The HAAP receives the second IP packet from the HG, and decapsulates the second IP packet to obtain the TCP/UDP packet. The HAAP decapsulates the TCP/UDP packet to obtain the QUIC packet. The HAAP decapsulates the QUIC packet to obtain the content part of the QUIC packet, that is, obtains the second IP packet, and sends the second IP packet to the host B.

Multipath data transmission is performed between the HG and the HAAP by using the QUIC protocol. The UDP is used in the transport layer protocol. In the QUIC protocol, multiplexing is implemented and security protection is provided. The QUIC protocol not only integrates the advantages of the HTTP 2.0, the TLS, and the TCP, but also reduces an access delay, and provides more convenient traffic congestion control and a more excellent correction mechanism. The host A and the HAAP perform single-path transmission, and the HAAP and the host B perform single-path transmission. The host A and the host B do not perceive multipath data transmission between intermediate network entities, namely, the HG and the HAAP. Therefore, any existing host device, such as an existing terminal or server, can implement multipath data transmission without upgrading software and hardware functions or modifying any configuration, thereby increasing a data transmission speed without affecting normal usage of a user.

Figure 3A:
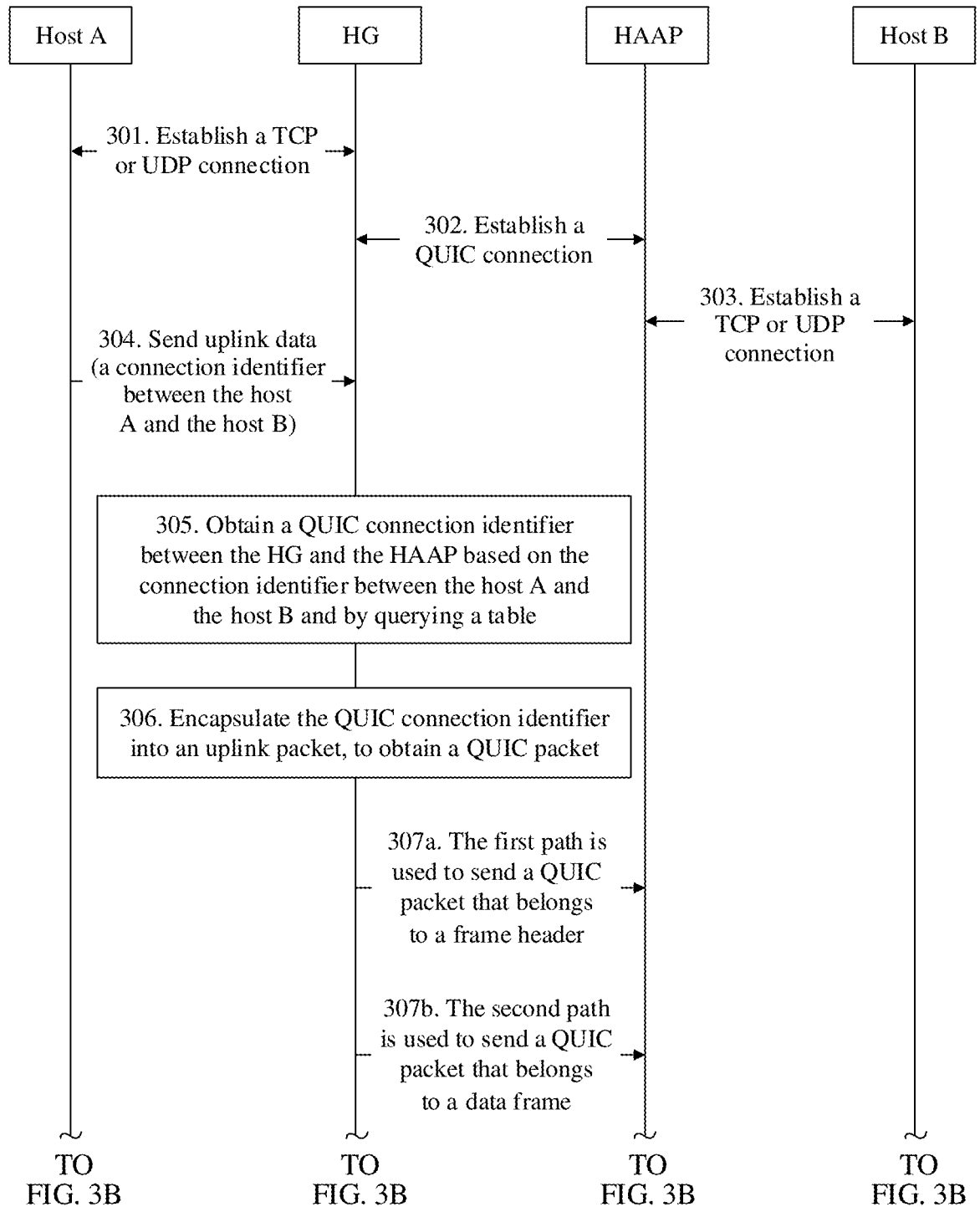
FIG. 3A and FIG. 3B are a schematic diagram of a QUIC connection-based multipath data transmission method according to an embodiment of this application.
Figure 3B:
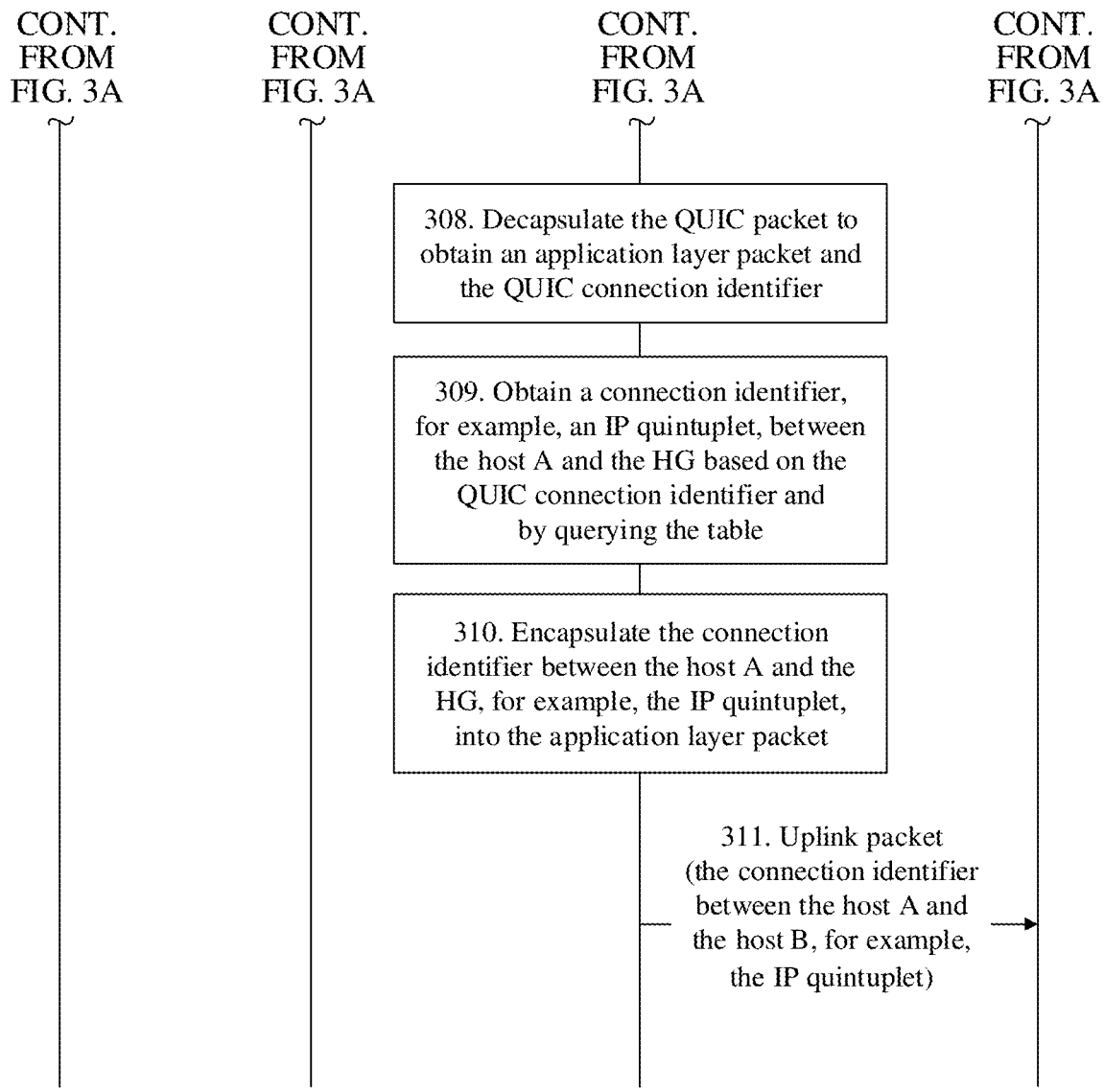

The following describes in detail, with reference to FIG. 3A and FIG. 3B, a multipath data transmission method provided in an embodiment of this application.

Operation 301. A first host device such as a host A establishes a connection to a first network device such as an HG, for example, establishes a TCP or UDP connection; and a second connection identifier between the first host device such as the host A and a second host device such as a host B is carried in the TCP connection establishment process.

A connection identifier represents a logical connection relationship between two devices. The second connection identifier is a connection identifier between the first host device such as the host A and the second host device such as the host B, and the second connection identifier is, for example, an IP quintuplet or a socket.

The host A establishes the TCP connection between the host A and the HG by using a TCP three-way handshake with the HG, and adds an IP quintuplet or socket of the host A and the host B to a TCP handshake message (SYN) of the TCP three-way handshake. The IP quintuplet includes an IP address of the host A, an IP address of the host B, a port number of the host A, a port number of the host B, and a protocol number.

Operation 302. The HG establishes a QUIC connection to the HAAP; and a QUIC connection identifier (connection ID) and the IP quintuplet of the host A and the host B are carried in the connection establishment process.

The HG sends a QUIC client connection request (QUIC client hello) message to the HAAP, and adds the QUIC connection identifier and the IP quintuplet to the QUIC client hello message. After receiving the QUIC client hello message, the HAAP stores the QUIC connection identifier and the IP quintuplet, and then feeds back a QUIC server connection request (QUIC server hello) message to the HG. After receiving the QUIC server hello message, the HG returns a QUIC connection complete (QUIC finish) message to the HAAP. In this case, establishment of the QUIC connection between the HG and the HAAP is completed.

Operation 303. The HAAP establishes a connection to the host B, for example, establishes a TCP or UDP connection; and a connection identifier between the host A and the host B is carried in the connection establishment process.

In an example, the connection identifier between the host A and the host B is the IP quintuplet or the socket.

The HAAP establishes the TCP connection between the HAAP and the host B by using a TCP three-way handshake with the host B, and adds the IP quintuplet or the socket of the host A and the host B to a TCP handshake message (SYN) of the TCP three-way handshake. The IP quintuplet includes the IP address of the host A, the IP address of the host B, the port number of the host A, the port number of the host B, and the protocol number.

Operation 304. The first host device such as the host A sends a packet to the first network device such as the HG, that is, the first network device such as the HG receives the packet from the first host device such as the host A; and the packet carries the connection identifier between the host A and the host B. Herein, the connection identifier between the host A and the host B is referred to as the second connection identifier.

In an example, the connection identifier between the host A and the host B, namely, the second connection identifier, is the IP quintuplet or the socket of the host A and the host B.

Operation 305. The first network device such as the HG obtains, based on the packet received by the first network device, the connection identifier between the first host device such as the host A and the second host device such as the host B, that is, obtains the second connection identifier; and determines, based on the second connection identifier, a connection identifier between the first network device such as the HG and the second network device such as the HAAP, that is, obtains a first connection identifier.

In an example, the first network device such as the HG obtains a QUIC connection identifier, namely, the connection ID, between the HG and the HAAP by querying a table such as the foregoing Table 1, that is, obtains the connection identifier between the HG and the HAAP, that is, obtains the first connection identifier.

It should be noted that a connection identifier shows a connection relationship between two devices, the first connection identifier shows a connection relationship between the first network device such as the HG and the second connection identifier such as the HAAP, and the second connection identifier shows a connection relationship between the first host such as the host A and the second host such as the host B.

The HG stores a correspondence between the second connection identifier and the first connection identifier. For example, the HG stores a correspondence between an IP quintuplet or socket and a QUIC connection identifier. After receiving the packet from the host A, the HG obtains the second connection identifier carried in the packet, that is, obtains the IP quintuplet or the socket in the packet. The HG obtains a corresponding QUIC connection identifier based on the IP quintuplet or the socket and by querying the correspondence between an IP quintuplet or socket and a QUIC connection identifier.

Operation 306. The first network device such as the HG encapsulates, based on the first connection identifier, that is, based on the QUIC connection identifier, the packet received by the HG.

In an example, the first network device such as the HG encapsulates the packet received by the first network device into a packet header of the packet, to obtain a QUIC packet. The received packet is a packet from the first host device such as the host A.

Operation 307. The first network device such as the HG sends the QUIC packet to the second network device such as the HAAP through one of a plurality of subflows between the first network device such as the HG and the second network device such as the HAAP. In other words, the first network device sends the QUIC packet to the second network device such as the HAAP through one of a plurality of paths between the first network device such as the HG and the second network device such as the HAAP.

In multipath transmission, a quantity of paths between two devices is equal to a quantity of subflows, and one subflow may be represented by one IP quintuplet.

In operation 307a, the HG sends a packet that belongs to a frame header part to the HAAP through a first path; and in operation 307b, the HG sends a packet that belongs to a data frame part to the HAAP through a second path.

For example, two transmission paths exist between the HG and the HAAP: a Wi-Fi network and a 4G network. The HG sends, according to a data transmission rule that is set by the HG, the packet in which the QUIC connection identifier is encapsulated to the HAAP through one of the two transmission paths. An example of the data transmission rule is: A packet that belongs to a frame header of a frame is transmitted by using the Wi-Fi network, and a packet that belongs to a data part of the frame is transmitted by using the 4G network. That is, if a data packet belongs to a frame header part of a frame, the data packet is transmitted by using the Wi-Fi network; or if a data packet belongs to a data part of a frame, the data packet is transmitted by using the 4G network.

Operation 308. The HAAP decapsulates the QUIC packet received by the HAAP, to obtain an application layer packet and the first connection identifier, that is, obtain the QUIC connection identifier (connection ID) between the HG and the HAAP.

Operation 309. The HAAP obtains the second connection identifier, that is, obtains the IP quintuplet or the socket of the host A and the host B, based on the first connection identifier, namely, the QUIC connection identifier between the HG and the HAAP, and by querying the correspondence between the second connection identifier and the first connection identifier, for example, by querying the foregoing Table 1.

In an example, the HAAP stores a correspondence between a QUIC connection identifier and socket, and a correspondence between the socket and an IP quintuplet. The HAAP obtains a QUIC connection identifier based on a packet received by the HAAP, and obtains an IP quintuplet based on the QUIC connection identifier.

In another example, the HAAP stores a correspondence between a QUIC connection identifier and an IP quintuplet. The HAAP obtains a QUIC connection identifier based on a packet received by the HAAP, and obtains an IP quintuplet based on the QUIC connection identifier.

Operation 310. The HAAP encapsulates the connection identifier obtained by the HAAP, for example, the IP quintuplet, into the application layer packet, to obtain an IP packet. The IP quintuplet includes the IP address of the host A, the port number of the host A, the IP address of the host B, the port number of the host B, and the protocol number.

Operation 311. The HAAP sends the application layer packet into which the IP quintuplet is encapsulated, namely, the IP packet, to the host B.

It should be noted that, in the QUIC-based multipath data transmission processing process described above (FIG. 3A and FIG. 3B and related content), packet acknowledgment and retransmission are omitted. In a packet transmission process, each time a receive end device receives several packets, for example, each time the receive end device receives 10 packets, the receive end device sends an acknowledgment (ACK) message to a transmit end. The following describes in detail two data acknowledgment methods for multipath transmission according to embodiments of this application.

A packet acknowledgment method based on multipath transmission provided in an embodiment of this application is that every two devices separately perform packet acknowledgment and retransmission. In other words, after a connection is established between two devices, the two devices perform packet acknowledgment and retransmission. After a host A establishes a connection to an HG, the host A and the HG perform packet acknowledgment and retransmission. After the HG establishes a connection to an HAAP, the HG and the HAAP perform packet acknowledgment and retransmission. After the HAAP establishes a connection to a host B, the HAAP and the host B perform packet acknowledgment and retransmission. After the HG establishes the connection to the HAAP, if the HG receives a packet from the HAAP, the HG sends a first acknowledgment message to the HAAP, as shown in FIG. 4.

Figure 4:
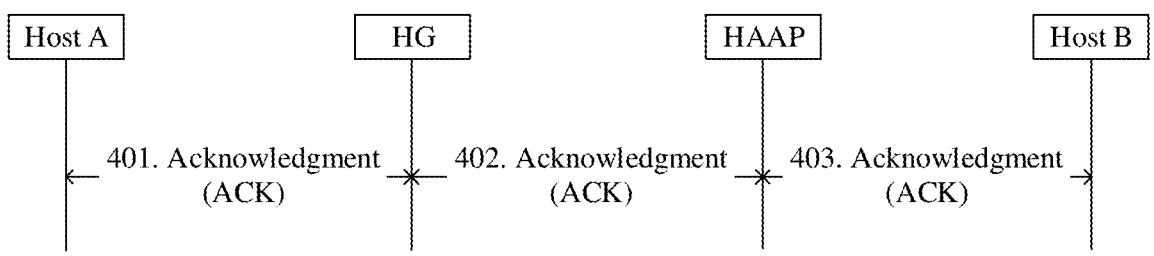
FIG. 4 is a schematic diagram of a packet acknowledgment method for QUIC connection-based multipath transmission according to an embodiment of this application.
Figure 5A:
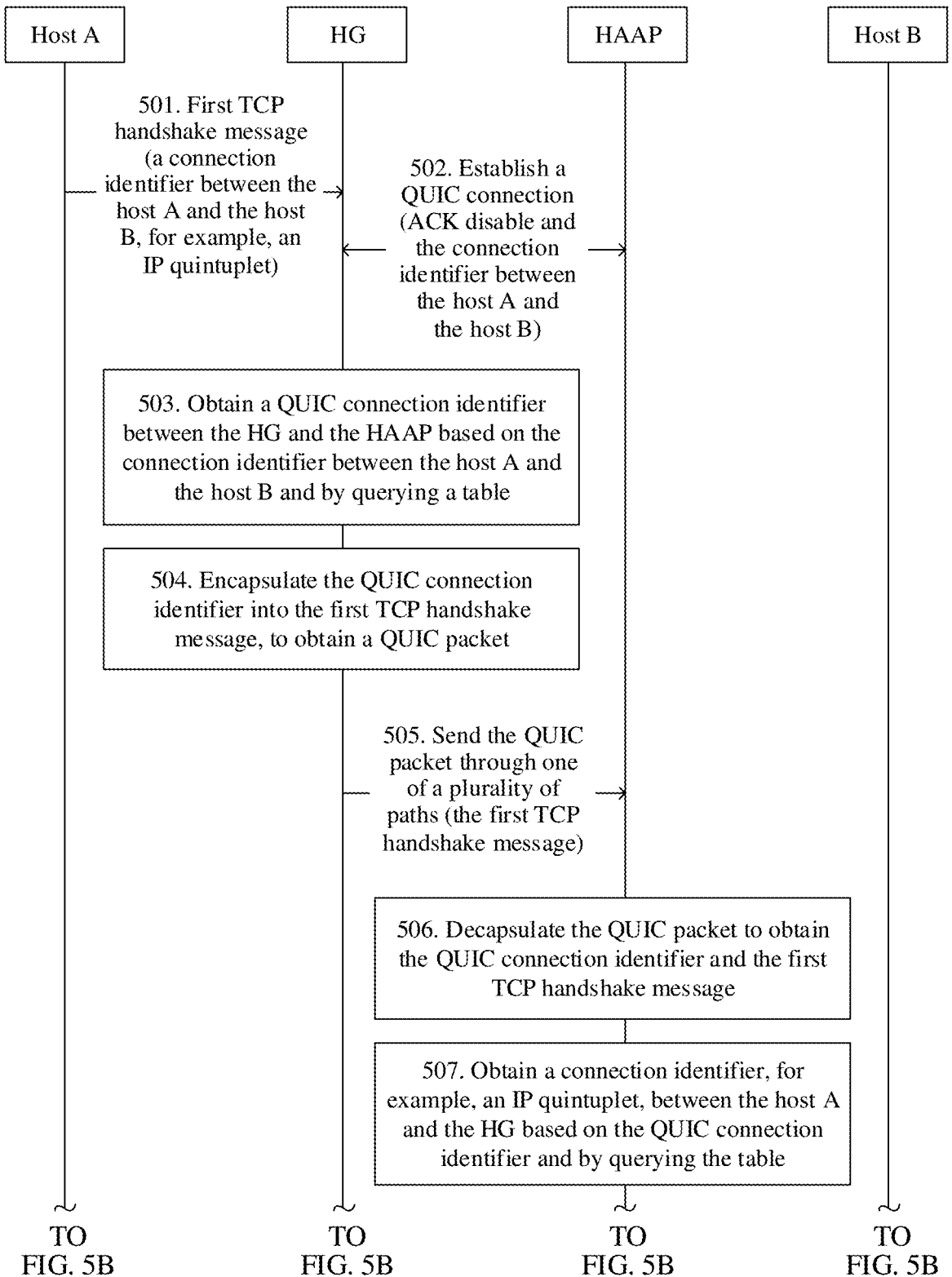
FIG. 5A, FIG. 5B, FIG. 5C, and FIG. 5D are a schematic diagram of another packet acknowledgment method for QUIC connection-based multipath transmission according to an embodiment of this application.
Figure 5B:
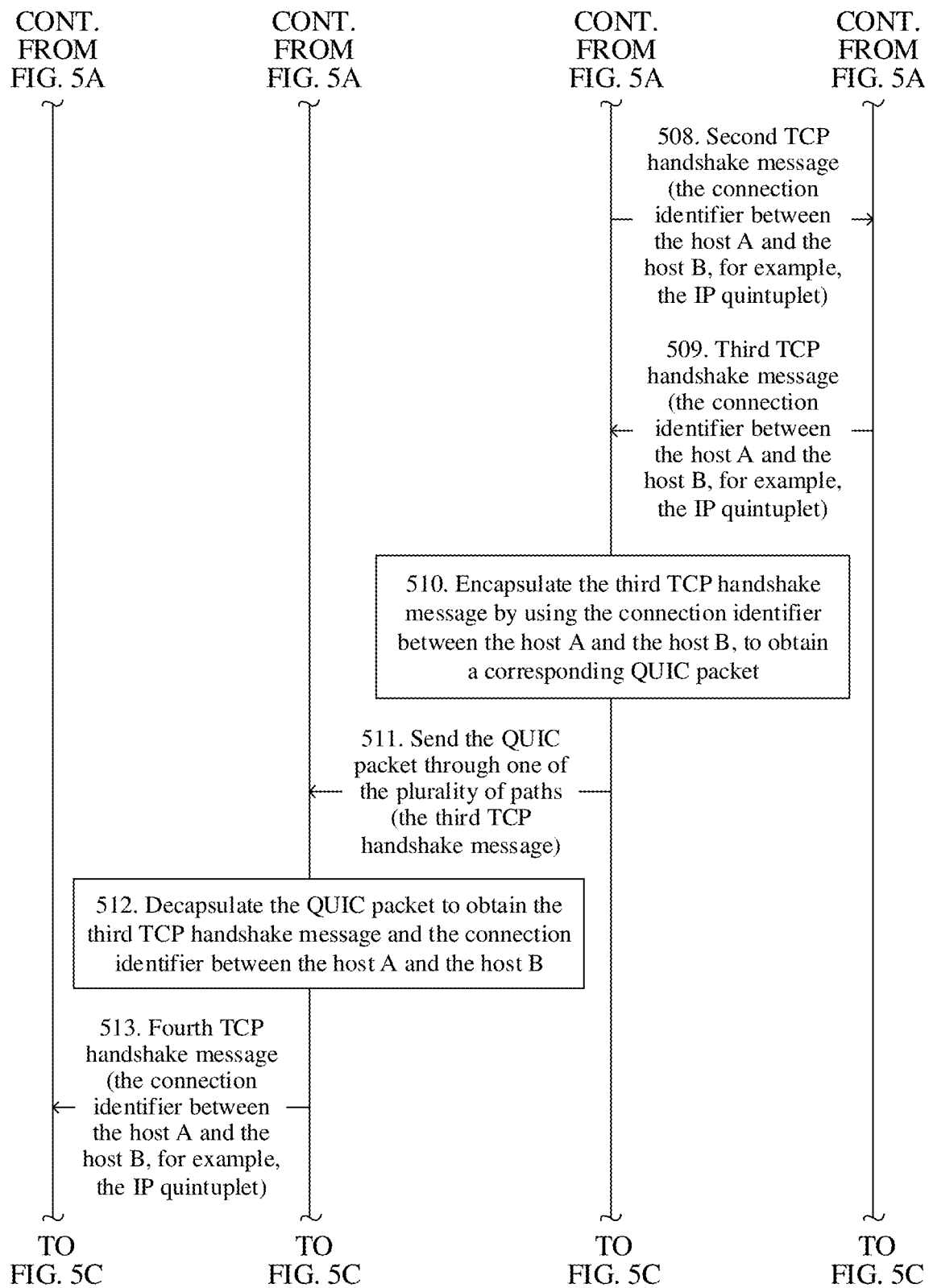
Figure 5C:
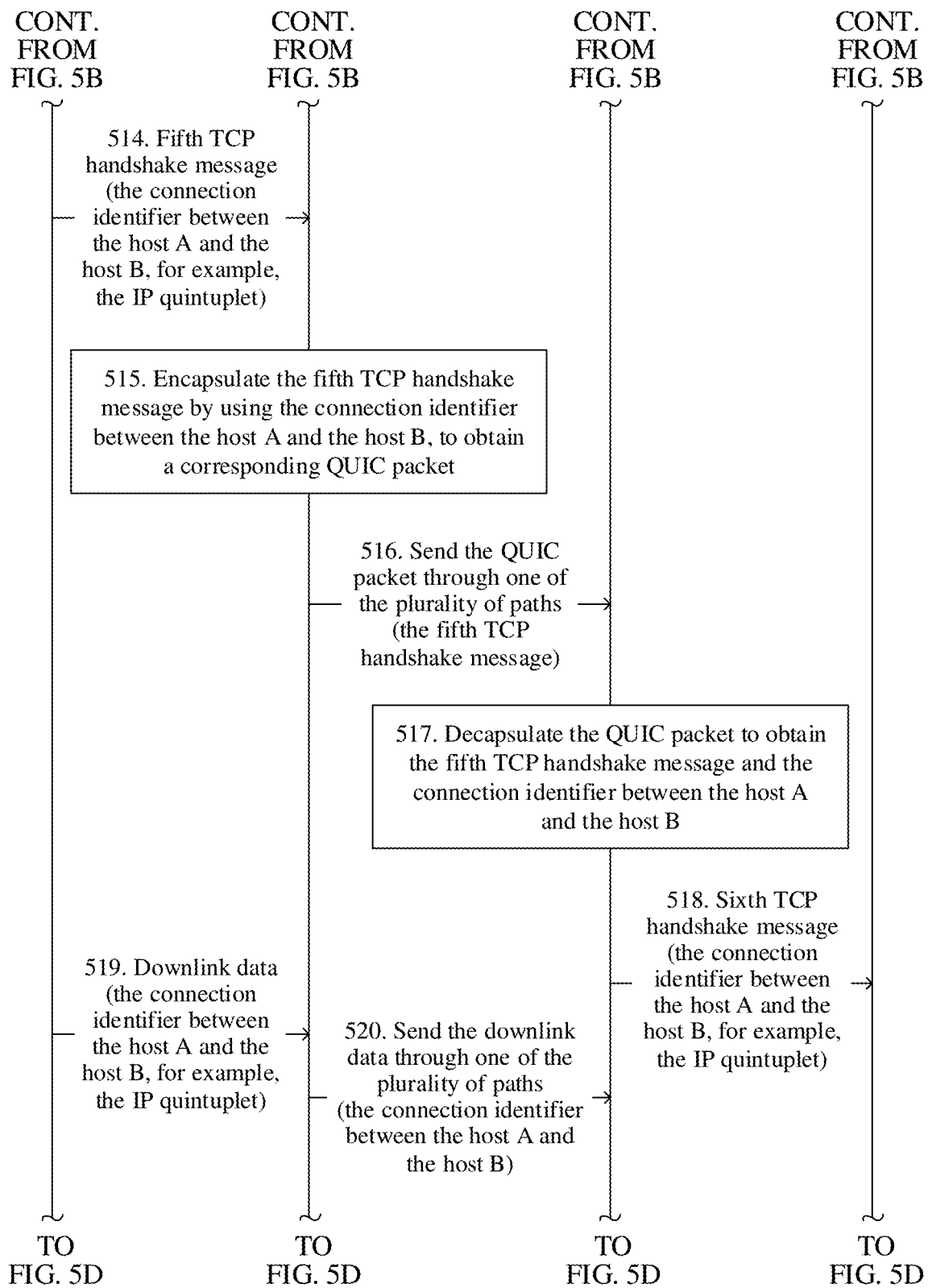
Figure 5D:
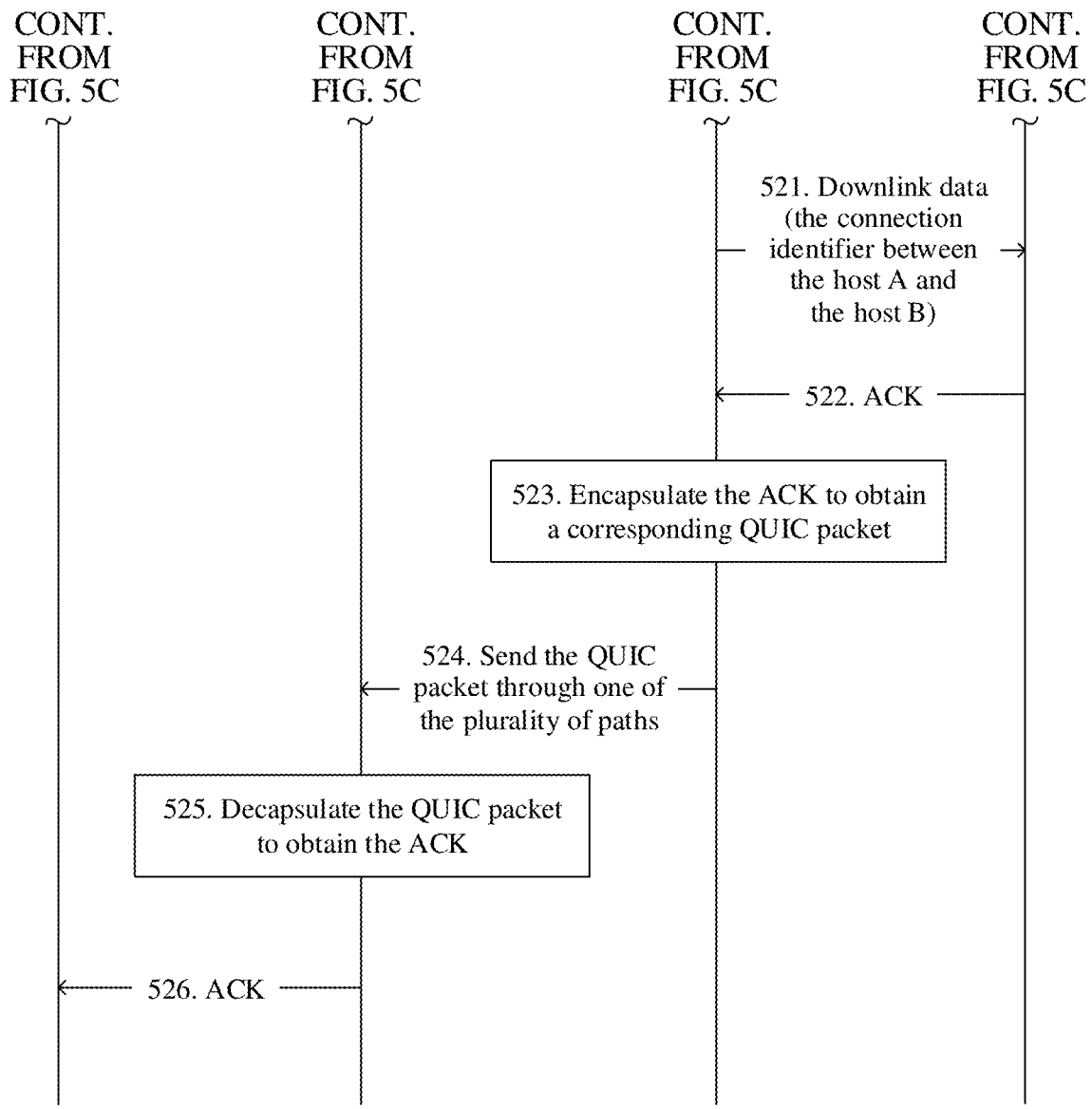

FIG. 4 is a schematic diagram of a packet acknowledgment method for QUIC connection-based multipath transmission according to an embodiment of this application.

Operation 401. After the host A completes establishment of the connection to the HG, a packet may be transmitted between the host A and the HG. After receiving a plurality of packets, for example, 10 packets, from the HG, the host A sends an acknowledgment (ACK) message to the HG. If the host A does not accept one or more packets from the HG within an agreed time, the host A sends a retransmission message to the HG. Likewise, after receiving a plurality of packets, for example, 10 packets, from the host A, the HG sends an acknowledgment (ACK) message to the host A. If the HG does not accept one or more packets from the host A within an agreed time, the HG sends a retransmission message to the host A. It can be learned that packet acknowledgment and retransmission between the host A and the HG are irrelevant to other connections. Packet acknowledgment and retransmission between the host A and the HG are irrelevant to connection establishment and packet transmission between the HG and the HAAP, and are also irrelevant to connection establishment and packet transmission between the HAAP and the host B.

Operation 402. After the HG completes establishment of the connection to the HAAP, a packet may be transmitted between the HG and the HAAP. After receiving a plurality of packets, for example, 10 packets, from the HAAP, the HG sends an acknowledgment (ACK) message to the HAAP. If the HG does not accept one or more packets from the HAAP within an agreed time, the HG sends a retransmission message to the HAAP. Likewise, after receiving a plurality of packets, for example, 10 packets, from the HG, the HAAP sends an acknowledgment (ACK) message to the HG. If the HAAP does not accept one or more packets from the HG within an agreed time, the HAAP sends a retransmission message to the HG. It can be learned that packet acknowledgment and retransmission between the HG and the HAAP are irrelevant to other connections. That is, packet acknowledgment and retransmission between the HG and the HAAP are irrelevant to connection establishment and packet transmission between the host A and the HG, and are also irrelevant to connection establishment and packet transmission between the HAAP and the host B.

Operation 403. After the HAAP completes establishment of the connection to the host B, a packet may be transmitted between the HAAP and the host B. After receiving a plurality of packets, for example, 10 packets, from the host B, the HAAP sends an acknowledgment (ACK) message to the host B. If the HAAP does not accept one or more packets from the host B within an agreed time, the HAAP sends a retransmission message to the host B. Likewise, after receiving a plurality of packets, for example, 10 packets, from the host B, the HAAP sends an acknowledgment (ACK) message to the host B. If the HAAP does not accept one or more packets from the host B within an agreed time, the HAAP sends a retransmission message to the host B. It can be learned that packet acknowledgment and retransmission between the HAAP and the host B are irrelevant to other connections. Packet acknowledgment and retransmission between the HAAP and the host B are irrelevant to connection establishment and packet transmission between the host A and the HG, and are also irrelevant to connection establishment and packet transmission between the HG and the HAAP.

A person skilled in the art understands that there is no sequence relationship between the foregoing operation 401, operation 402, and operation 403.

Another packet acknowledgment method based on multipath transmission provided in an embodiment of this application is that after connections between all devices are established, a receive end device performs acknowledgment or retransmission with a transmit end device. After the host A completes establishment of the connection to the HG, the HG completes establishment of the connection to the HAAP, and the HAAP completes establishment of the connection to the host B, after the host A sends downlink data to the host B by using the HG and the HAAP, and after the host B receives a plurality of packets, for example, 10 packets, the host B performs acknowledgment with the host A by using the HAAP and the HG. If the host B does not receive one or more packets from the host A within a predetermined time, the host B sends a retransmission message to the host A by using the HAAP and the HG.

In other words, a first network device such as the HG establishes a connection to a first host device such as the host A, the first network device such as the HG establishes a connection to a second network device such as the HAAP, and the first network device such as the HG establishes a connection to a second host device such as the host B by using the second network device such as the HAAP. The first network device receives, through one of a plurality of subflows between the first network device such as the HG and the second network device such as the HAAP, a second acknowledgment packet that is from the second host device such as the host B and that is forwarded by the second network device such as the HAAP.

Details are described below with reference to FIG. 5A, FIG. 5B, FIG. 5C, and FIG. 5D.

FIG. 5A, FIG. 5B, FIG. 5C, and FIG. 5D are a schematic diagram of another packet acknowledgment method for QUIC connection-based multipath transmission according to an embodiment of this application.

In FIG. 5A, FIG. 5B, FIG. 5C, and FIG. 5D, an example in which the host A establishes a TCP connection to the HG, and the HAAP also establishes a TCP connection to the host B is used. Actually, the host A may also establish a single connection such as a UDP connection to the HG, and the HAAP may also establish a single connection such as a UDP connection to the host B.

Operation 501. The host A sends a first TCP handshake message (SYN) to the HG, and adds, to the first TCP handshake message, a connection identifier between the host A and the host B, for example, an IP quintuplet or socket.

It should be noted that in operation 501, the host A sends the first TCP handshake message to the HG, and the first TCP handshake between the host A and the HG is completed. A three-way TCP handshake between the host A and the HG includes the first TCP handshake, a fourth TCP handshake message sent in the following operation 513, and a fifth TCP handshake message sent in the following operation 514. That is, the fourth TCP handshake message sent in operation 513 is actually used to complete the second TCP handshake between the host A and the HG. The fifth TCP handshake message sent in operation 514 is used to complete the third TCP handshake between the host A and the HG. Therefore, after operation 514, that is, after the third TCP handshake between the host A and the HG is completed, the host A establishes the TCP connection to the HG.

Operation 502. The HG establishes a QUIC connection to the HAAP; and an acknowledgment function deactivation (ACK disable) is carried in the QUIC connection establishment process. A function of the ACK disable is as follows: After the HG establishes a connection to the HAAP, packet acknowledgment is not performed between the HG and the HAAP.

In an example, a QUIC connection identifier (connection ID) and an IP quintuplet or socket are further carried in the QUIC connection establishment process (an example in which the IP quintuplet is carried in the QUIC connection establishment process is used below).

The HG sends a QUIC client connection request (QUIC client hello) message to the HAAP, and adds the QUIC connection identifier (connection ID), the IP quintuplet, and the acknowledgment function deactivation (ACK disable) to the QUIC client hello message. The HAAP returns a QUIC server connection request (QUIC Server hello) message to the HG, and adds the QUIC connection identifier (connection ID), the IP quintuplet, and the acknowledgment function deactivation (ACK disable) to the QUIC server hello message. The HG returns a QUIC connection complete (QUIC finish) message to the HAAP, and adds the QUIC connection identifier (connection ID), the IP quintuplet, and the acknowledgment function deactivation (ACK disable) to the QUIC finish message.

In the foregoing operation 502, in the QUIC connection establishment process, the acknowledgment function deactivation message is carried in a QUIC connection request message that is transmitted between the HG and the HAAP, so that the HG and the HAAP negotiate to determine not to use an acknowledgment (ACK) function, and a packet acknowledgment function and a packet retransmission function are not used between the HG and the HAAP. This scenario is applicable to a scenario in which a packet loss rate for a QUIC connection is low.

Operation 503. The HG obtains, from a packet received by the HG, a connection identifier between the host A and the host B, where the connection identifier between the host A and the host B is referred to as a second connection identifier, and obtains a connection identifier between the HG and the HAAP based on the second connection identifier and by querying a table such as the foregoing Table 1. Herein, the connection identifier between the HG and the HAAP is referred to as a first connection identifier.

The HG stores a correspondence between the second connection identifier and the first connection identifier. For example, the HG stores a correspondence between an IP quintuplet or socket and a QUIC connection identifier. After receiving a packet from the host A, the HG obtains the second connection identifier carried in the packet, that is, obtains the IP quintuplet or the socket in the packet. The HG obtains a corresponding QUIC connection identifier based on the IP quintuplet or the socket and by querying the correspondence between an IP quintuplet or socket and a QUIC connection identifier.

Operation 504. The HG encapsulates the first TCP handshake message by using the first connection identifier, namely, the QUIC connection identifier, to obtain a corresponding QUIC packet. The QUIC packet carries the first handshake message. The first handshake message is from the host A (referring to operation 501).

Operation 505. The HG sends the QUIC packet to the HAAP through one of a plurality of paths between the HG and the HAAP; and the QUIC packet carries the first TCP handshake message.

For how the HG sends the QUIC packet to the HAAP through one of the plurality of paths, refer to the related content description in operation 307 above.

Operation 506. The HAAP decapsulates the QUIC packet received by the HAAP, to obtain the first connection identifier, that is, obtain the QUIC connection identifier (connection ID) between the HG and the HAAP, and obtain the first TCP handshake message.

Operation 507. The HAAP obtains the second connection identifier based on the first connection identifier, namely, the QUIC connection identifier between the HG and the HAAP and by querying the correspondence between the second connection identifier and the first connection identifier, that is, obtains the IP quintuplet or the socket of the host A and the host B.

In an example, the HAAP stores a correspondence between a QUIC connection identifier and socket, and a correspondence between the socket and an IP quintuplet. The HAAP obtains a QUIC connection identifier based on a packet received by the HAAP, and obtains an IP quintuplet based on the QUIC connection identifier.

In another example, the HAAP stores a correspondence between a QUIC connection identifier and an IP quintuplet. The HAAP obtains a QUIC connection identifier based on a packet received by the HAAP, and obtains an IP quintuplet based on the QUIC connection identifier.

Operation 508. The HAAP sends a second TCP handshake message to the host B; and the second TCP handshake message carries the IP quintuplet or the socket.

It should be noted that in operation 508, the second TCP handshake message sent by the HAAP to the host B is actually a TCP handshake message sent by the HAAP to the host B for the first time, and the first TCP handshake between the HAAP and the host B is completed. In operation 508, the second TCP handshake message sent by the HAAP to the host B, a three-way TCP handshake between the HAAP and the host B includes a third TCP handshake message sent by the host B to the HAAP in operation 509, and a sixth TCP handshake message sent by the HAAP to the host B in operation 518. In operation 509, the third TCP handshake message sent by the host B to the HAAP is actually used to complete the second TCP handshake between the HAAP and the host B. In operation 518, the sixth TCP handshake message sent by the HAAP to the host B is used to complete the three-way TCP handshake between the HAAP and the host B. Therefore, after operation 518, that is, after the three-way TCP handshake between the HAAP and the host B is completed, the HAAP establishes the TCP connection to the host B.

Operation 509. The host B sends the third TCP handshake message to the HAAP; and the third TCP handshake message carries the IP quintuplet or the socket.

Operation 510. The HAAP encapsulates the second connection identifier such as the IP quintuplet into the third TCP handshake message to obtain a corresponding QUIC packet.

Operation 511. The HAAP sends the QUIC packet to the HG through one of the plurality of paths between the HAAP and the HG; and the QUIC packet carries the third TCP handshake message.

For how the HAAP sends the QUIC packet to the HG through one of the plurality of paths, refer to the related content description in operation 307 above.

Operation 512. The HG decapsulates the QUIC packet to obtain the third handshake message and the second connection identifier, for example, obtain the IP quintuplet.

Operation 513. The HG sends the fourth TCP handshake message to the host A, and a process of sending the fourth TCP handshake message is a process of the second TCP handshake between the host A and the HG, where the fourth TCP handshake message carries the IP quintuplet or the socket.

Operation 514. The host A sends the fifth TCP handshake message to the HG, and a process of sending the fifth TCP handshake message is a process of the third TCP handshake between the host A and the HG, where the fifth TCP handshake message carries the IP quintuplet or the socket.

It should be noted that after the foregoing operation 514, that is, after the three-way TCP handshake between the host A and the HG is completed, the host A establishes the TCP connection to the HG.

In addition, an example in which the host A establishes the TCP connection to the HG is used in this embodiment of this application. Actually, the host A may alternatively establish a UDP connection to the HG.

Operation 515. The HG encapsulates the fifth TCP handshake message by using the second connection identifier such as the IP quintuplet, to obtain a corresponding QUIC packet.

Operation 516. The HG sends the QUIC packet to the HAAP through one of the plurality of paths between the HG and the HAAP, where the QUIC packet carries the fifth TCP handshake message, and the fifth TCP handshake message is sent by the host A to the HG in the foregoing operation 514.

For how the HG sends the QUIC packet to the HAAP through one of the plurality of paths, refer to the related content description in operation 307 above.

Operation 517. The HAAP decapsulates the QUIC packet to obtain the fifth TCP handshake message and the second connection identifier such as the IP quintuplet.

Operation 518. The HAAP sends the sixth TCP handshake message to the host B, and a process of sending the sixth TCP handshake message is a process of the third TCP handshake between the HAAP and the host B, where the sixth TCP handshake message carries the IP quintuplet or the socket.

It should be noted that after the foregoing operation 518, that is, after the three-way handshake between the HAAP and the host B is completed, the HAAP establishes the TCP connection to the host B.

In addition, an example in which the HAAP establishes the TCP connection to the host B is used in this embodiment of this application. Actually, the HAAP may alternatively establish a UDP connection to the host B.

In conclusion, operation 501, operation 513, and operation 514 are the TCP connection establishment process between the host A and the HG, operation 502 is the QUIC connection establishment process between the HG and the HAAP, and operation 508, operation 509, and operation 518 are the TCP connection establishment process between the HAAP and the host B. Therefore, after operation 518, the host A establishes the connection to the host B by using the HG and the HAAP, and the host A can perform data transmission with the host B by using the HG and the HAAP.

Therefore, the foregoing operation 501 to operation 518 are the process in which the host A establishes the connection to the host B by using the HG and the HAAP, the following operation 519 to operation 521 are a process in which the host A sends data to the host B by using the HG and the HAAP, and operation 522 to operation 526 are a process in which the host B sends an acknowledgment (ACK) message to the host A.

Operation 519. The host A starts to send downlink data to the HG, and adds the IP quintuplet or the socket to a downlink packet.

Operation 520. The HG sends the downlink packet received by the HG to the HAAP through one of the plurality of paths between the HG and the HAAP, where the packet carries the IP quintuplet or the socket.

For how the HG sends the packet to the HAAP through one of the plurality of paths, refer to the related content description in operation 307 above.

Operation 521. The HAAP sends the downlink packet received by the HAAP to the host B; and the packet carries the IP quintuplet or the socket.

Operation 522. The host B sends an acknowledgment (ACK) message to the HAAP, where the ACK message is used to acknowledge, by using the HAAP and the HG, that the packet from the host A has been received. For example, each time the host B receives 10 packets from the host A, the host B sends an ACK message by using the HAAP and the HG.

Operation 523. The HAAP encapsulates the acknowledgment (ACK) message to obtain a corresponding QUIC packet, and selects one of the plurality of paths between the HG and the HAAP, where the selected path is used to send the QUIC packet to the HG.

In an example, the HAAP selects a path with a lower delay from the plurality of paths between the HAAP and the HG, to send the QUIC packet.

Operation 524. The HAAP sends the QUIC packet to the HG through the path selected by the HAAP.

Operation 525. The HG decapsulates the QUIC packet to obtain the acknowledgment (ACK) message.

Operation 526. The HG sends, to the host A, the acknowledgment message obtained through decapsulation.

In an example, if the host A does not receive the acknowledgment message within an agreed time, the host A sends a retransmission message to the host B by using the HG and the HAAP.

It should be noted that the foregoing operation 522 to operation 526 are a process in which after receiving a plurality of packets, for example, 10 packets, from the host A, the host B sends the acknowledgment message to the host A by using the HAAP and the HG. Actually, after the host B sends uplink data to the host A by using the HAAP and the HG, after the host A receives a plurality of packets, for example, 10 packets, the host A also sends an acknowledgment (ACK) message to the host B. A method for sending the acknowledgment message by the host A to the host B is the same as a method for sending the acknowledgment message by the host B to the host A. For details, refer to the foregoing operation 522 to operation 526.

The foregoing describes a QUIC-based multipath data transmission method provided in an embodiment of this application. The following describes a MPTCP-based multipath data transmission method.

Figure 6:
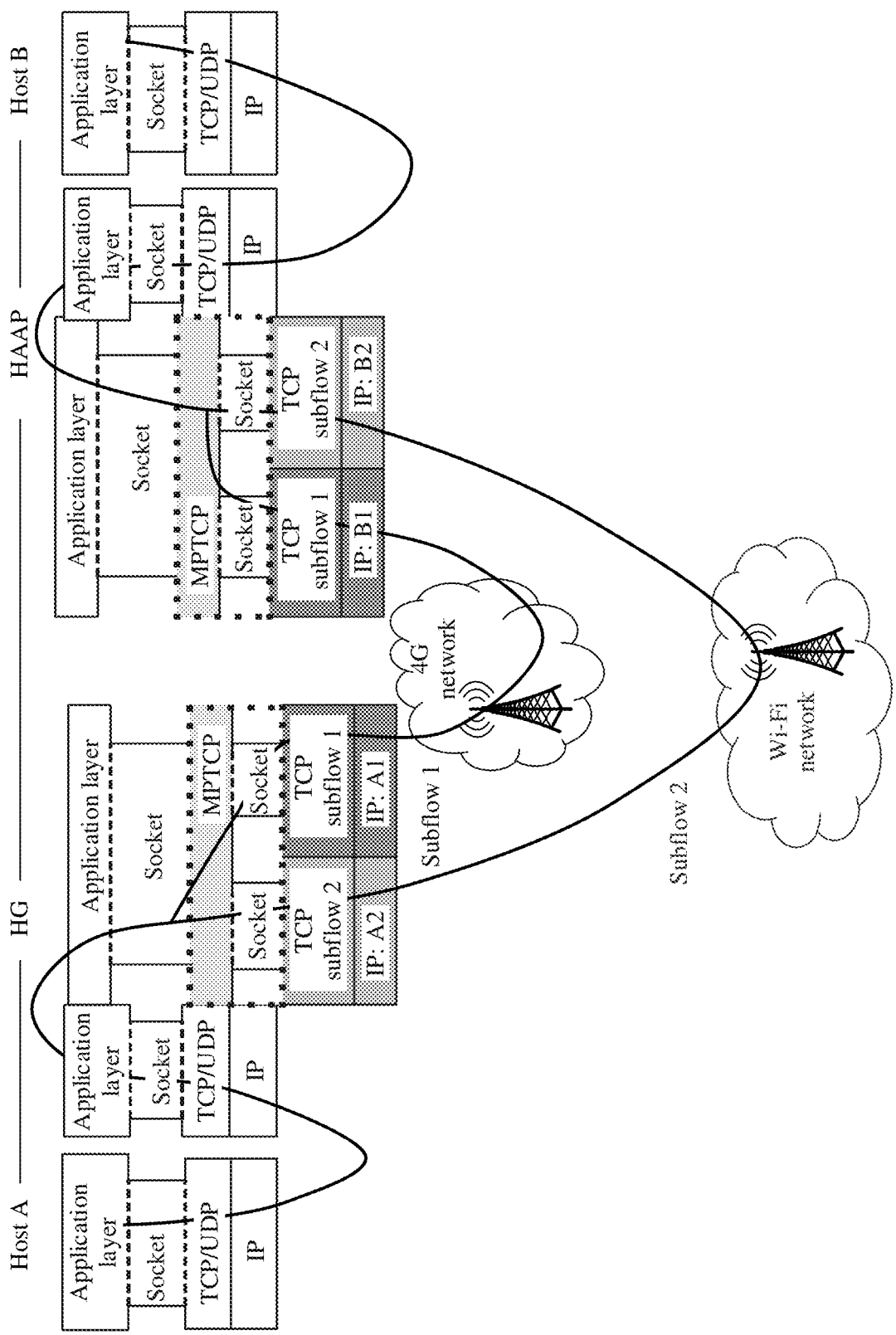
FIG. 6 is a schematic diagram of a protocol stack of MPTCP connection-based multipath data transmission according to an embodiment of this application.

In the MPTCP, an MPTCP layer that supports multipath transmission is added between an application layer and a transport layer, as shown in FIG. 6. For MPTCP-based multipath data transmission, a conventional TCP data flow is divided into a plurality of TCP subflows, and different TCP subflows are transmitted along different paths.

FIG. 6 is a schematic diagram of a protocol stack of MPTCP connection-based multipath data transmission according to an embodiment of this application.

In FIG. 6, an HG has a plurality of interfaces, for example, a 4G interface and a Wi-Fi interface. An HAAP also has a plurality of interfaces, for example, a 4G interface and a Wi-Fi interface. The HG and the HAAP may communicate with a host B through both the Wi-Fi interface and the 4G interface, so that communication bandwidth is increased. In FIG. 6, an IP address of the Wi-Fi interface of the HG is A1, and an IP address of the 4G interface of the HG is A2. An IP address of the Wi-Fi interface of the HAAP is B1, and an IP address of the 4G interface of the HAAP is B2.

It can be learned from FIG. 6 that a host A and the host B may use any existing host device, software and hardware functions and configurations of the host A and the host B are unchanged, and a data transmission process is also unchanged. For a packet processing process, refer to FIG. 1 and the related content description.

In FIG. 6, a process in which the HG decapsulates a packet is also the same as an existing decapsulation process of the HG. For details, refer to FIG. 1 and the related content description. The following describes in detail how the HG encapsulates an application layer packet. The HG encapsulates the application layer packet into a packet header of an MPTCP packet, to obtain the MPTCP packet. Subsequently, the MPTCP packet is transmitted to the HAAP through an IP layer through one of a plurality of TCP subflows, for example, a TCP subflow 1 or a TCP subflow 2.

In addition, the HG may not decapsulate an IP packet received by the HG (that is, from the host A). That is, the HG does not need to decapsulate the IP packet to obtain the application layer packet, but directly encapsulates the IP packet received by the HG into the packet header of the MPTCP packet. In this case, after receiving the packet from the HG, the HAAP can obtain the IP packet by removing only the packet header of the QUIC packet. Then, the HAAP sends the IP packet to the host B. FIG. 6 shows the previous implementation. That is, FIG. 6 shows only that the HG decapsulates the IP packet received by the HG to obtain the application layer packet, and then encapsulates the application layer packet. The HAAP receives the IP packet from the HG through a plurality of paths. The HAAP decapsulates the IP packet to obtain a TCP packet. The HAAP decapsulates the TCP packet to obtain the application layer packet and a socket. The HAAP obtains an IP quintuplet based on the socket and by using a correspondence between a socket and an IP quintuplet that is stored by the HAAP. The HAAP encapsulates the application layer packet and encapsulates the socket into a packet header of the TCP/UDP packet, to obtain the IP packet. Then, the HAAP sends the IP packet to the corresponding host B based on the IP quintuplet obtained by the HAAP.

It should be noted that if the HG does not decapsulate the IP packet received by the HG, but directly encapsulates the TCP/IP packet received by the HG and sends the encapsulated packet to the HAAP, after the HAAP receives the packet, the HAAP may first decapsulate the packet and remove the packet header of the MPTCP packet, and then directly send the TCP/IP packet to the host B. The reason is that after decapsulating the packet received by the HAAP, the HAAP obtains the TCP/IP packet.

Figure 7:
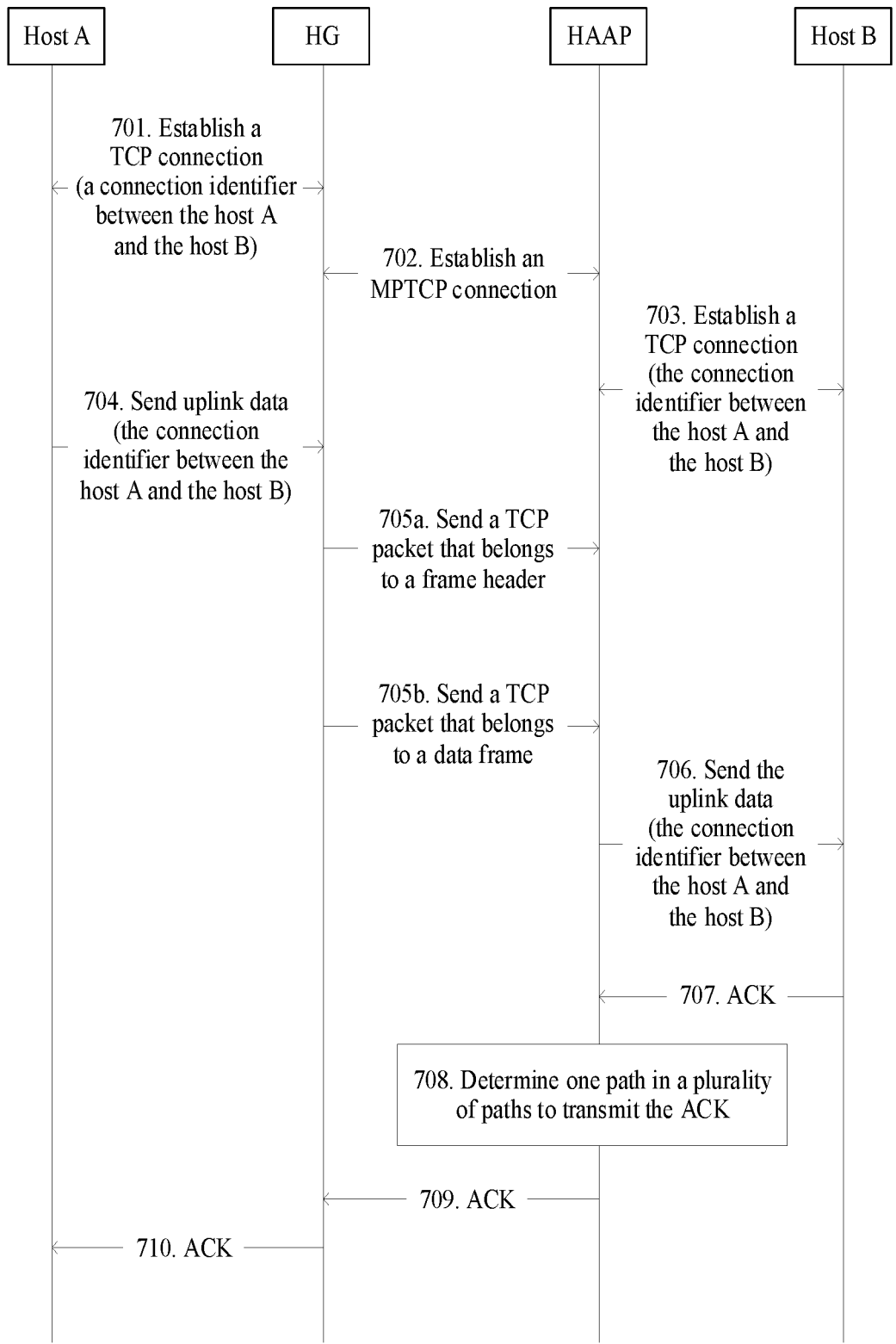
FIG. 7 is a schematic diagram of an MPTCP connection-based multipath data transmission method according to an embodiment of this application.

The following describes in detail, with reference to FIG. 7, an MPTCP connection-based multipath data transmission method provided in an embodiment of this application.

Operation 701. A host A such as a terminal device establishes a TCP connection to an HG; and a connection identifier between the host A and a host B is carried in the TCP connection establishment process.

In an example, the connection identifier between the host A and the host B is an IP quintuplet or socket.

The host A establishes the TCP connection between host A and the HG by using a TCP three-way handshake with the HG, and adds the IP quintuplet or the socket of the host A and the host B to a TCP handshake message (SYN) of the TCP three-way handshake. The IP quintuplet includes an IP address of the host A, an IP address of the host B, a port number of the host A, a port number of the host B, and a protocol number.

Operation 702. The HG establishes an MPTCP connection to the HAAP.

The HG sends an MPTCP connection request message to the HAAP, and an optional (option) field of the MPTCP connection request message includes information indicating that the message is the MPTCP connection request message. After receiving the MPTCP connection request message, the HAAP returns an MPTCP connection request acknowledgment message to the HG, and an optional (option) field of the MPTCP connection request acknowledgment message includes information indicating that the message is the MPTCP connection request acknowledgment message. Then, the HG returns an MPTCP connection acknowledgment message to the HAAP, and an optional (option) field of the message includes information indicating that the message is the MPTCP connection acknowledgment message.

Operation 703. The HAAP establishes a TCP connection to the host B; and the connection identifier between the host A and the host B is carried in the connection establishment process.

In an example, the connection identifier between the host A and the host B is an IP quintuplet or socket.

The HAAP establishes the TCP connection between the HAAP and the host B by using a TCP three-way handshake with the host B, and adds the IP quintuplet or the socket of the host A and the host B to a TCP handshake message (SYN) of the TCP three-way handshake. The IP quintuplet includes the IP address of the host A, the IP address of the host B, the port number of the host A, the port number of the host B, and the protocol number.

After the foregoing operation 703, the host A completes establishment of the connection to the HG, the HG completes establishment of the connection to the HAAP, and the HAAP completes establishment of the connection to the host B. The host A may communicate with the host B by using the HG and the HAAP. The following continues to describe data transmission and acknowledgment.

Operation 704. The host A sends uplink data to the HG, and adds the connection identifier between the host A and the host B to an uplink packet. In an example, the connection identifier is an IP quintuplet or socket of the host A and the host B.

It can be learned from FIG. 6 that the TCP connection and the MPTCP connection belong to a same type of connection. In the TCP connection, a socket is encapsulated in a packet header of an application layer packet to obtain a TCP packet. In the MPTCP connection, a socket is also encapsulated in a packet header of an application layer packet to obtain a TCP packet. A difference lies only in that the MPTCP is a multipath TCP, that is, a plurality of TCP packets may be simultaneously transmitted between the HG and the HAAP. However, only one packet can be transmitted between the host A and the HG at a time. Therefore, the HG does not need to perform mapping. That is, a socket is encapsulated in a packet received by the HG, and the socket is also encapsulated in a packet sent by the HG. Therefore, the HG does not need to perform mapping.

Operation 705. The HG sends a TCP packet to the HAAP through one of a plurality of paths between the HG and the HAAP.

In operation 705a, the HG sends a packet that belongs to a frame header part to the HAAP through a first path; and in operation 705b, the HG sends a packet that belongs to a data frame part to the HAAP through a second path.

For example, two transmission paths exist between the HG and the HAAP. The HG sends, according to a data transmission rule that is set by the HG, the TCP packet to the HAAP through one of the two transmission paths. An example of the data transmission rule is: A packet that belongs to a frame header of a frame is transmitted by using a Wi-Fi network, and a packet that belongs to a data part of the frame is transmitted by using a 4G network. That is, if a data packet belongs to a frame header part of a frame, the data packet is transmitted by using the Wi-Fi network; or if a data packet belongs to a data part of a frame, the data packet is transmitted by using the 4G network.

Operation 706. The HAAP sends, to the host B, the packet that is received by the HAAP through one of the plurality of paths.

It should be noted that the foregoing operation 704 to operation 706 are the data packet transmission processing process, and the following continues to describe a packet acknowledgment or retransmission process.

Operation 707. After receiving one or more packets, for example, 10 packets, from the host A, the host B sends an acknowledgment (ACK) message to the HAAP.

Operation 708. After receiving the acknowledgment (ACK) message, the HAAP determines one path in the plurality of paths, for example, determines the 4G network in the 4G network and the Wi-Fi network, where the determined path is used to transmit the acknowledgment (ACK) message from the host B.

In an example, the HAAP selects a path with a low transmission delay from the plurality of paths, to transmit the acknowledgment (ACK) message from the host B.

Operation 709. The HAAP sends the acknowledgment (ACK) message to the HG.

Operation 710. The HG sends the acknowledgment (ACK) message to the host A.

In an example, if the host A does not receive the acknowledgment message from the host B within an agreed time, the host A sends a retransmission message to the host B by using the HG and the HAAP.

It can be learned from the foregoing content that operation 707 to operation 710 are the process in which after the host B receives the one or more packets, for example, 10 packets, from the host A, the host B sends the acknowledgment message to the host A by using the HAAP and the HG, and the HG and the HAAP perform multipath data transmission.

After receiving one or more packets, for example, 10 packets, from the host B, the host A sends an acknowledgment (ACK) message to the host B by using the HG and the HAAP. In addition, if the host B does not receive the acknowledgment message from the host A within an agreed time, the host B sends a retransmission message to the host A by using the HAAP and the HG.

Figure 8:
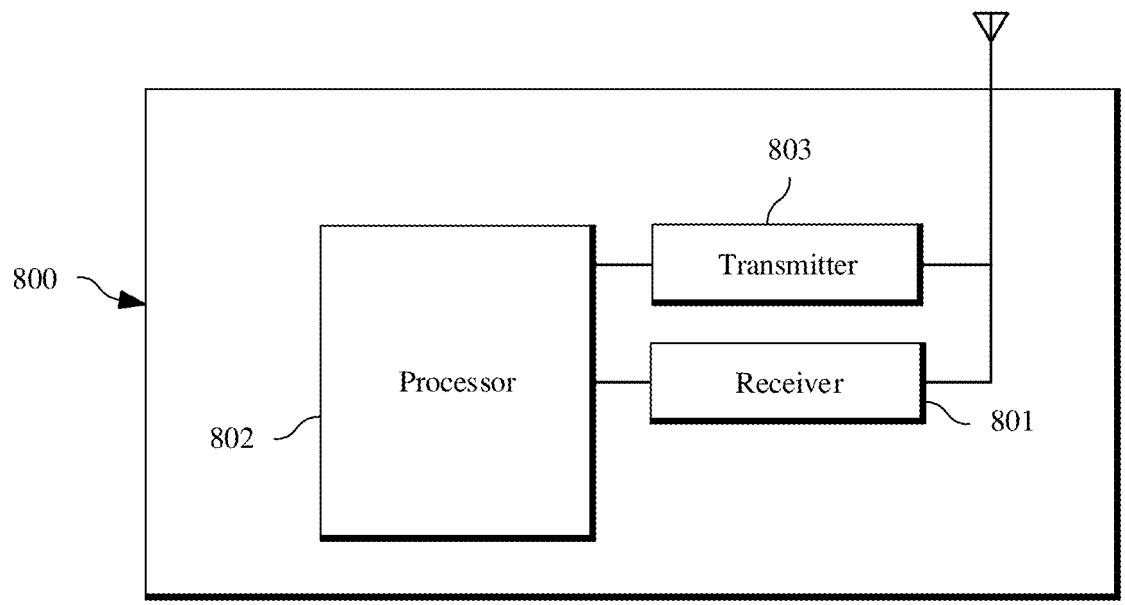
FIG. 8 is a schematic diagram of a first network device according to an embodiment of this application.

FIG. 8 is a schematic diagram of a first network device according to an embodiment of this application. The first network device includes a receiver 801, a processor 802, and a transmitter 803.

The receiver 801 is configured to: receive a packet that is from a first host device and that is forwarded by a second network device, and determine a first connection identifier between the first network device and the second network device based on the packet.

The processor 802 is configured to encapsulate the packet based on the first connection identifier.

The transmitter 803 is configured to send the encapsulated packet to the second network device through one of a plurality of subflows between the first network device and the second network device.

In an example, the processor 802 is configured to: obtain a second connection identifier from the packet, where the second connection identifier is a connection identifier between the first host device and the second host device; and determine the first connection identifier based on the second connection identifier and a correspondence between the first connection identifier and the second connection identifier, where the first network device includes the correspondence between the first connection identifier and the second connection identifier.

In an example, the second connection identifier includes a socket or an internet protocol (IP) quintuplet of the first host device and the second host device, and the first connection identifier is a connection identifier (connection ID) between the first network device and the second network device.

In an example, the processor 802 is further configured to establish a connection between the first network device and the second network device. The transmitter 803 is further configured to send an acknowledgment message to the second network device when the first network device receives a packet from the second network device.

In an example, the processor 802 is further configured to: establish a connection to the first host device, establish a connection to the second network device, and establish a connection to the second host device by using the second network device; and the receiver 801 is further configured to receive, through one of the plurality of subflows between the first network device and the second network device, a second acknowledgment packet that is from the second host device and that is forwarded by the second network device.

In an example, acknowledgment message function deactivation information ACK disable is carried in the process of establishing the connection between the first network device and the second network device.

In an example, the encapsulating, by the processor 802, the packet based on the first connection identifier is specifically: encapsulating, by the processor, an application layer packet based on the first connection identifier.

In an example, the encapsulating, by the processor 802, the packet based on the first connection identifier is specifically: encapsulating, by the processor, an internet protocol (IP) packet based on the first connection identifier.

Figure 9:
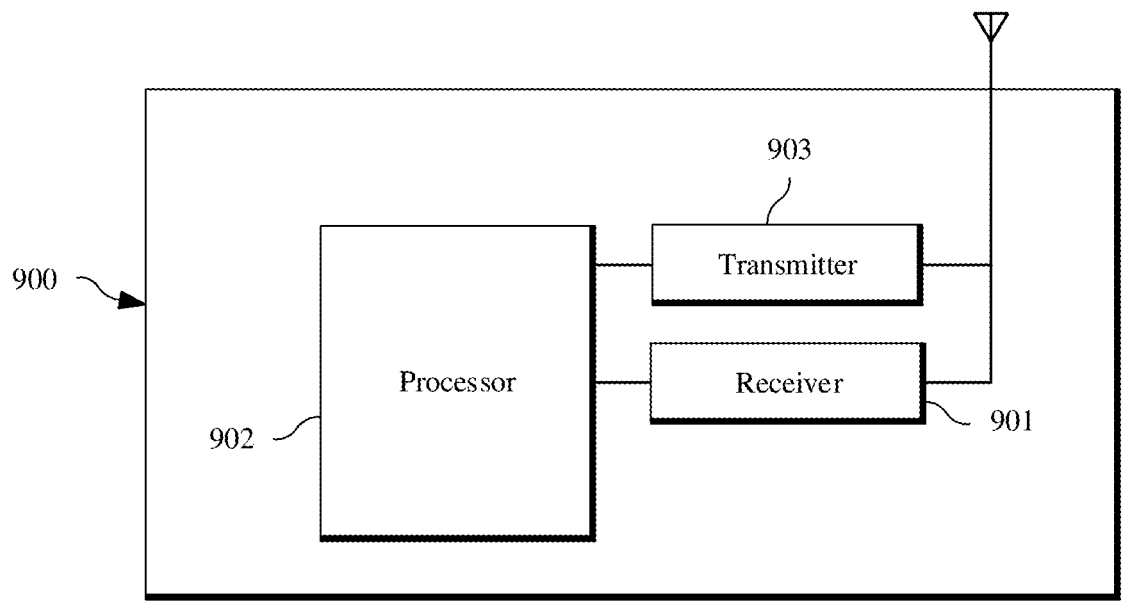
FIG. 9 is a schematic diagram of a second network device according to an embodiment of this application.

FIG. 9 is a schematic diagram of a second network device according to an embodiment of this application. The second network device includes a receiver 901, a processor 902, and a transmitter 903.

The receiver 901 is configured to receive a packet through one of a plurality of subflows between the first network device and the second network device.

The processor 902 is configured to determine a first connection identifier based on the packet, where the first connection identifier is a connection identifier between a first host device and a second host device, the first host device is a host device connected to the second network device, and the second host device is a host device connected to the first network device.

The transmitter 903 is configured to send the packet to the second host device based on the first connection identifier.

In an example, the determining, by the processor 902, a first connection identifier based on the packet is specifically: obtaining, by the processor, a second connection identifier from the packet, where the second connection identifier is a connection identifier between the first network device and the second network device; and the second network device includes a correspondence between the first connection identifier and the second connection identifier, and the processor is further configured to obtain the first connection identifier based on the correspondence and the second connection identifier.

In an example, after the processor 902 receives the packet through one of the plurality of subflows between the first network device and the second network device, the processor is further configured to decapsulate the packet to obtain an application layer packet.

In an example, the determining, by the processor 902, a first connection identifier based on the packet is specifically: obtaining, by the processor, the first connection identifier in the decapsulation process.

In an example, the first connection identifier includes a socket or an internet protocol (IP) quintuplet of the first host device and the second host device, and the second connection identifier is a connection identifier (connection ID) between the first network device and the second network device.

In an example, the processor 902 is further configured to establish a connection between the first network device and the second network device. The transmitter 903 is further configured to send an acknowledgment message to the second network device when the first network device receives a packet from the second network device.

In an example, before the receiver 901 receives the packet through one of the plurality of subflows between the first network device and the second network device, the processor is further configured to establish a connection to the second network device; and acknowledgment message function deactivation information ACK disable is carried in the connection establishment process.

Figure 10:
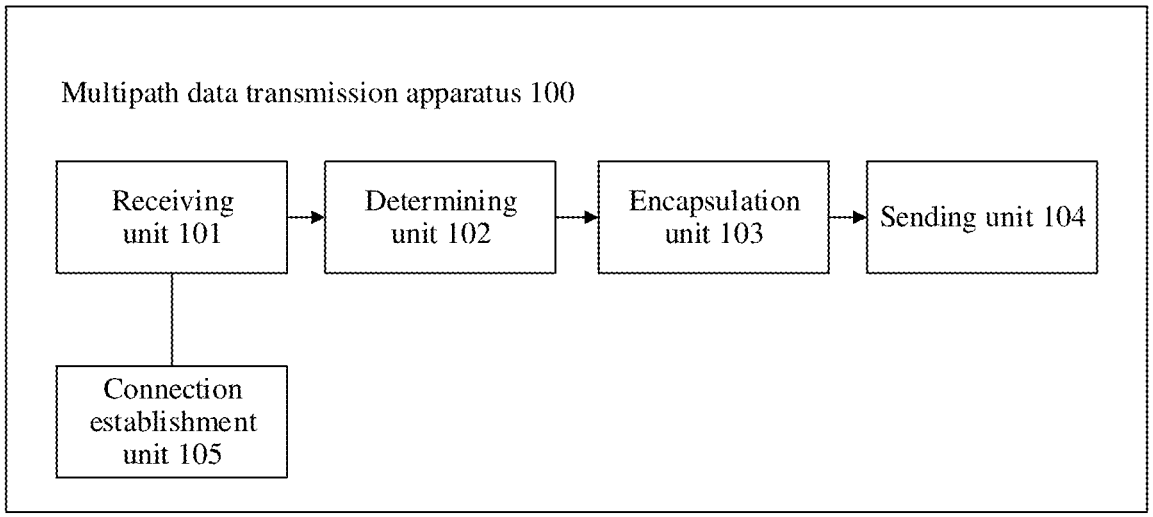
FIG. 10 is a schematic diagram of a multipath data transmission apparatus according to an embodiment of this application.

FIG. 10 is a schematic diagram of a multipath data transmission apparatus according to an embodiment of this application. The multipath data transmission apparatus 100 includes a receiving unit 101, a determining unit 102, an encapsulation unit 103, and a sending unit 104.

The receiving unit 101 is configured to receive a packet from a first host device.

The determining unit 102 is configured to determine a first connection identifier between the first network device and a second network device based on the packet.

The encapsulation unit 103 is configured to encapsulate the packet based on the first connection identifier.

The sending unit 104 is configured to send the encapsulated packet to the second network device through one of a plurality of subflows between the first network device and the second network device.

In an example, the determining unit 102 is configured to: obtain a second connection identifier from the packet, where the second connection identifier is a connection identifier between the first host device and the second host device; and determine the first connection identifier based on the second connection identifier and a correspondence between the first connection identifier and the second connection identifier, where the first network device includes the correspondence between the first connection identifier and the second connection identifier.

In an example, the second connection identifier includes a socket or an internet protocol (IP) quintuplet of the first host device and the second host device, and the first connection identifier is a connection identifier (connection ID) between the first network device and the second network device.

In an example, the multipath data transmission apparatus 100 further includes a connection establishment unit 105. The connection establishment unit 105 is configured to establish a connection between the first network device and the second network device. The sending unit 104 is further configured to send an acknowledgment message to the second network device when the receiving unit 101 receives a packet from the second network device.

In another example, the multipath data transmission apparatus 100 further includes a connection establishment unit 105. The connection establishment unit is configured to: establish a connection between the first network device and the first host device, establish a connection between the first network device and the second network device, and establish a connection between the first network device and the second host device by using the second network device. The receiving unit 101 is further configured to receive, through one of the plurality of subflows between the first network device and the second network device, a second acknowledgment packet that is from the second host device and that is forwarded by the second network device.

In an example, acknowledgment message function deactivation information ACK disable is carried in the process in which the connection establishment unit 105 establishes the connection between the first network device and the second network.

In an example, the encapsulation unit 103 is configured to encapsulate an application layer packet based on the first connection identifier.

In another example, the encapsulation unit 103 is configured to encapsulate an internet protocol (IP) packet based on the first connection identifier.

Figure 11:
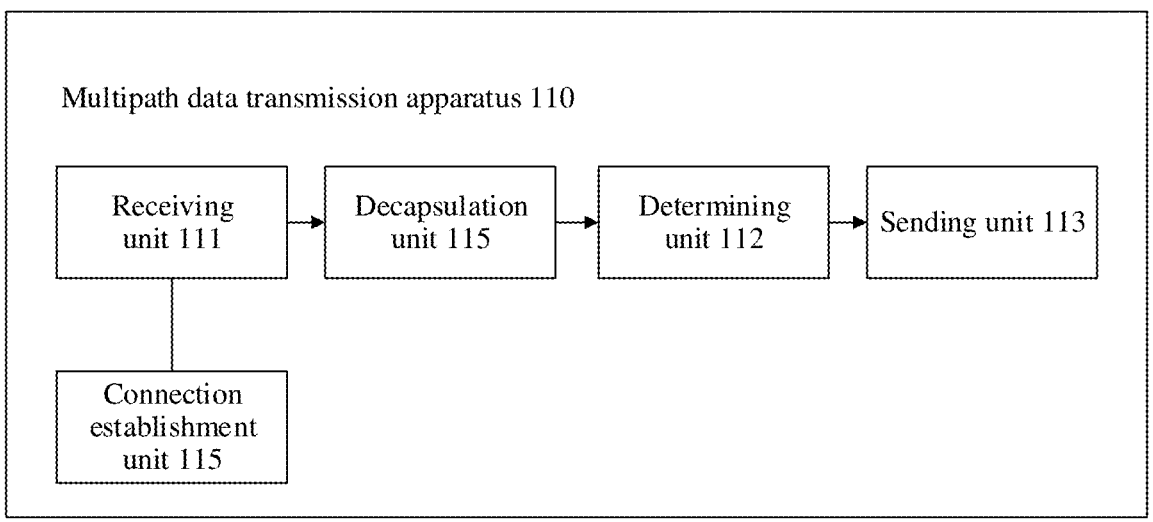
FIG. 11 is a schematic diagram of another multipath data transmission apparatus according to an embodiment of this application.

FIG. 11 is a schematic diagram of a multipath data transmission apparatus according to another embodiment of this application. The multipath data transmission apparatus 110 includes a receiving unit 111, a determining unit 112, and a sending unit 113.

The receiving unit 111 is configured to receive a packet through one of a plurality of subflows between the first network device and a second network device.

The determining unit 112 is configured to determine a first connection identifier based on the packet, where the first connection identifier is a connection identifier between a first host device and a second host device, the first host device is a host device connected to the first network device, and the second host device is a host device connected to the second network device.

The sending unit 113 is configured to send the packet to the second host device based on the first connection identifier.

In an example, the determining unit 112 is configured to: obtain a second connection identifier from the packet, where the second connection identifier is a connection identifier between the first network device and the second network device; and determine the first connection identifier based on the second connection identifier and a correspondence between the first connection identifier and the second connection identifier, where the first network device includes the correspondence between the first connection identifier and the second connection identifier.

In an example, the multipath data transmission apparatus 110 further includes a decapsulation unit 114. The decapsulation unit 114 is configured to: after the first network device receives the packet through one of the plurality of subflows between the first network device and the second network device, decapsulate the packet to obtain an application layer packet.

In an example, the determining, by the determining unit 112, a first connection identifier based on the packet is specifically: obtaining, by the first network device, the first connection identifier in the decapsulation process.

In an example, the first connection identifier includes a socket or an internet protocol (IP) quintuplet of the first host device and the second host device, and the second connection identifier is a connection identifier (connection ID) between the first network device and the second network device.

In an example, the multipath data transmission apparatus 110 further includes a connection establishment unit 115. The connection establishment unit 115 is configured to enable the first network device to establish a connection to the second network device. The sending unit 113 is further configured to send an acknowledgment message to the second network device when the first network device receives a packet from the second network device.

In another example, the multipath data transmission apparatus 110 further includes a connection establishment unit 115. The connection establishment unit 115 is configured to: before the receiving unit 111 receives the packet through one of the plurality of subflows between the first network device and the second network device, establish a connection between the first network device and the second network device, and add acknowledgment message function deactivation information ACK disable to the packet transmitted in the connection establishment process.

A person skilled in the art may be further aware that, in combination with the examples described in the embodiments disclosed in this specification, units and algorithm operations may be implemented by electronic hardware, computer software, or a combination thereof. To describe the interchangeability between the hardware and the software, the foregoing has generally described compositions and operations of each example according to functions. Whether the functions are performed by hardware or software depends on a particular application and a design constraint condition of a technical solution. A person skilled in the art may use different methods to implement the described functions for each particular application, but it should not be considered that the implementation goes beyond the scope of this application.

A person of ordinary skill in the art may understand that all or some of the operations of the methods in the foregoing embodiments may be implemented by a program instructing a processor. The program may be stored in a computer-readable storage medium. The storage medium is a non-transitory medium, such as a random access memory, a read-only memory, a flash memory, a hard disk, a solid state drive, a magnetic tape, a floppy disk, an optical disc, or any combination thereof.

The foregoing descriptions are merely preferred specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multipath data transmission method, wherein the method comprises:
   receiving, by a first network device, a packet from a first host device to a second host device, and determining a value for a first connection identifier between the first network device and a second network device based on the packet, wherein each of a plurality of subflows between the first network device and the second network device shares the first connection identifier;
   encapsulating, by the first network device, the packet based on the first connection identifier; and
   sending, by the first network device, the encapsulated packet to the second network device through one of the plurality of subflows between the first network device and the second network device,
   wherein the determining the value of the first connection identifier between the first network device and the second network device based on the packet comprises:
   obtaining a value of a second connection identifier from the packet, wherein the second connection identifier is a connection identifier between the first host device and the second host device; and
   determining the value of the first connection identifier based on the second connection identifier and a correspondence between the first connection identifier and the second connection identifier, wherein the first network device is configured to store the correspondence between the first connection identifier and the second connection identifier.

2. The method according to claim 1, wherein the second connection identifier comprises a socket or an internet protocol (IP) quintuplet of the first host device and the second host device.

3. The method according to claim 1, wherein the method further comprises:
   establishing, by the first network device, a connection to the second network device, and sending, by the first network device, an acknowledgment message to the second network device when the first network device receives a packet from the second network device.

4. The method according to claim 1, wherein the method further comprises:
establishing, by the first network device, a connection to the first host device, establishing, by the first network device, a connection to the second network device, and establishing, by the first network device, a connection to the second host device by using the second network device; and
receiving, by the first network device through one of the plurality of subflows between the first network device and the second network device, a second acknowledgment packet that is from the second host device and that is forwarded by the second network device.

5. The method according to claim 4, wherein acknowledgment message function deactivation information (ACK) disable is carried in the process of establishing the connection between the first network device and the second network device.

6. The method according to claim 1, wherein the encapsulating, by the first network device, the packet based on the first connection identifier comprises:
encapsulating, by the first network device, an application layer packet based on the first connection identifier.

7. The method according to claim 1, wherein the encapsulating, by the first network device, the packet based on the first connection identifier comprises:
encapsulating, by the first network device, an internet protocol (IP) packet based on the first connection identifier.

8. The method according to claim 1, wherein each of the plurality of subflows between the first network device and the second network device are based on a quick UDP internet connection (QIUC) protocol, and
wherein the encapsulated packet sent to the second network device is a QUIC packet.

9. A multipath data transmission method, wherein the method comprises:
receiving, by a first network device, a packet through one of a plurality of subflows between the first network device and a second network device;
determining, by the first network device, a value of a first connection identifier based on the packet, wherein the first connection identifier is a connection identifier between a first host device and a second host device, the first host device is a host device connected to the first network device, and the second host device is a host device connected to the second network device, wherein the determining, by the first network device, the value of the first connection identifier based on the packet comprises:
obtaining, by the first network device, a value of a second connection identifier from the packet, wherein the second connection identifier is a connection identifier between the first network device and the second network device, and wherein each of the plurality of subflows between the first network device and the second network device shares the second connection identifier; and
obtaining, by the first network device, the value of the first connection identifier based on the second connection identifier and a correspondence between the first connection identifier and the second connection identifier, wherein the first network device is configured to store the correspondence between the first connection identifier and the second connection identifier;

sending, by the first network device, the packet to the second host device based on the first connection identifier; and
receiving, by the second host device, the packet.

10. The method according to claim 9, wherein after the receiving, by the first network device, the packet through one of the plurality of subflows between the first network device and the second network device, the method further comprises:
decapsulating, by the first network device, the packet to obtain an application layer packet.

11. The method according to claim 10, wherein the determining, by the first network device, the first connection identifier based on the packet comprises:
obtaining, by the first network device, the first connection identifier in the decapsulation process.

12. The method according to claim 9, wherein the first connection identifier comprises a socket or an internet protocol (IP) quintuplet of the first host device and the second host device.

13. The method according to claim 9, wherein the method further comprises:
establishing, by the first network device, a connection to the second network device, and sending, by the first network device, an acknowledgment message to the second network device when the first network device receives a packet from the second network device.

14. The method according to claim 9, wherein before the receiving, by the first network device, the packet through one of the plurality of subflows between the first network device and the second network device, the method further comprises:
establishing, by the first network device, a connection to the second network device, and adding acknowledgment message function deactivation information (ACK) disable to the packet transmitted in the connection establishment process.

15. A first network device, comprising:
a receiver, configured to: receive a packet that is from a first host device to a second host device and that is forwarded by a second network device, and determine a value of a first connection identifier between the first network device and the second network device based on the packet, wherein each of a plurality of subflows between the first network device and the second network device shares the first connection identifier;
a processor, configured to obtain a value of a second connection identifier from the packet, wherein the second connection identifier is a connection identifier between the first host device and the second host device, determine the value of the first connection identifier based on the second connection identifier and a correspondence between the first connection identifier and the second connection identifier, and encapsulate the packet based on the first connection identifier, wherein the first network device is configured to store the correspondence between the first connection identifier and the second connection identifier; and
a transmitter, configured to send the encapsulated packet to the second network device through one of the plurality of subflows between the first network device and the second network device.

16. The first network device according to claim 15, wherein the second connection identifier comprises a socket or an internet protocol (IP) quintuplet of the first host device and the second host device.

17. The first network device according to claim 15, wherein the processor is further configured to establish a connection between the first network device and the second network device; and the transmitter is further configured to send an acknowledgment message to the second network device when the first network device receives a packet from the second network device.

18. The first network device according to claim 15, wherein the processor is further configured to: establish a connection to the first host device, establish a connection to the second network device, and establish a connection to the second host device by using the second network device; and the receiver is further configured to receive, through one of the plurality of subflows between the first network device and the second network device, a second acknowledgment packet that is from the second host device and that is forwarded by the second network device.

* * * * *